US010844467B2

(12) United States Patent
Gaensbauer et al.

(10) Patent No.: US 10,844,467 B2
(45) Date of Patent: Nov. 24, 2020

(54) COMPACT CONTINUOUS ANNEALING SOLUTION HEAT TREATMENT

(71) Applicant: Novelis Inc., Atlanta, GA (US)

(72) Inventors: David Anthony Gaensbauer, Atlanta, GA (US); David Michael Custers, Inverary (CA); Michael Kosmicki, Spokane, WA (US); Curtis Eddie, Newton Falls, OH (US); Andrew James Hobbis, Kennesaw, GA (US)

(73) Assignee: NOVELIS INC., Atlanta, GA (US)

( * ) Notice: Subject to any disclaimer, the term of this patent is extended or adjusted under 35 U.S.C. 154(b) by 0 days.

(21) Appl. No.: 15/716,608

(22) Filed: Sep. 27, 2017

(65) Prior Publication Data

US 2018/0087138 A1    Mar. 29, 2018

Related U.S. Application Data

(60) Provisional application No. 62/400,426, filed on Sep. 27, 2016, provisional application No. 62/505,948, filed on May 14, 2017.

(51) Int. Cl.
  *C22F 1/04* (2006.01)
  *B21C 47/18* (2006.01)
  (Continued)

(52) U.S. Cl.
  CPC ............... *C22F 1/04* (2013.01); *B21B 39/02* (2013.01); *B21B 39/34* (2013.01); *B21C 47/16* (2013.01);
  (Continued)

(58) Field of Classification Search
  CPC ......... B21B 39/02; B21B 39/34; B21C 47/16; B21C 47/18; B21C 47/3433;
  (Continued)

(56) References Cited

U.S. PATENT DOCUMENTS 1,872,045 A    8/1932    Smitmans
2,001,637 A    5/1935    Talbot
              (Continued)

FOREIGN PATENT DOCUMENTS

CN      1190361 A    8/1998
CN    101795785 A    8/2010
              (Continued)

OTHER PUBLICATIONS

International Patent Application No. PCT/US2017/053826, International Search Report and Written Opinion dated Dec. 20, 2017, 14 pages.

(Continued)

*Primary Examiner* — Scott R Kastler
*Assistant Examiner* — Michael Aboagye
(74) *Attorney, Agent, or Firm* — Kilpatrick Townsend & Stockton LLP

(57) ABSTRACT

A compact heat treatment line can include a short heating zone capable of rapidly bringing a metal strip to a suitable solutionizing temperature through the use of magnetic rotors, such as permanent magnet magnetic rotors. A fast and efficient soaking zone can be achieved as well, such as through the use of magnetic rotors to levitate the metal strip within a gas-filled chamber. Magnetic rotors can further levitate the metal strip through a quenching zone, and can optionally reheat the metal strip prior to final coiling. Magnetic rotors used to heat and/or levitate the metal strip can also provide tension control, can facilitate initial threading of the metal strip, and can cure coatings and/or promote uniformity of coatings/lubricants applied to the metal strip without overheating. Such a heat treatment line can provide continuous annealing and solution heat treating in a much more compacted space than traditional processing lines.

19 Claims, 11 Drawing Sheets

(51) Int. Cl.

| | | |
|---|---|---|
| *B21C 47/34* | (2006.01) | |
| *H05B 6/10* | (2006.01) | |
| *B21C 47/16* | (2006.01) | |
| *B65H 29/00* | (2006.01) | |
| *B65H 29/20* | (2006.01) | |
| *B21D 22/02* | (2006.01) | |
| *B21D 37/16* | (2006.01) | |
| *C21D 1/42* | (2006.01) | |
| *F27D 99/00* | (2010.01) | |
| *H05B 6/32* | (2006.01) | |
| *H05B 6/36* | (2006.01) | |
| *B21B 39/02* | (2006.01) | |
| *B21B 39/34* | (2006.01) | |
| *B21C 37/02* | (2006.01) | |
| *C21D 1/04* | (2006.01) | |
| *C22C 21/02* | (2006.01) | |
| *C22C 21/06* | (2006.01) | |
| *C22C 21/10* | (2006.01) | |
| *C22C 21/12* | (2006.01) | |
| *B65G 54/02* | (2006.01) | |
| *C22F 1/02* | (2006.01) | |
| *H02N 15/00* | (2006.01) | |
| *F27D 19/00* | (2006.01) | |

(52) U.S. Cl.
CPC .......... *B21C 47/18* (2013.01); *B21C 47/3433* (2013.01); *B21C 47/3483* (2013.01); *B21D 22/022* (2013.01); *B21D 37/16* (2013.01); *B65H 29/006* (2013.01); *B65H 29/20* (2013.01); *C21D 1/42* (2013.01); *F27D 99/0001* (2013.01); *H05B 6/104* (2013.01); *H05B 6/32* (2013.01); *H05B 6/36* (2013.01); *B21C 37/02* (2013.01); *B65G 54/02* (2013.01); *C21D 1/04* (2013.01); *C22C 21/02* (2013.01); *C22C 21/06* (2013.01); *C22C 21/10* (2013.01); *C22C 21/12* (2013.01); *C22F 1/02* (2013.01); *F27D 2019/0003* (2013.01); *H02N 15/00* (2013.01); *Y02P 10/25* (2015.11)

(58) Field of Classification Search
CPC .. B21C 47/3483; B21D 22/022; B21D 37/16; B65H 29/006; B65H 29/20; C21D 1/42; C22F 1/02; C22F 1/04; F27D 2019/0003; F27D 99/0001; H05B 6/104; H05B 6/32; H05B 6/36
USPC ........ 266/249, 250, 252; 219/645, 656, 648, 219/662, 670, 651; 432/128, 152; 148/516, 287, 307, 527, 529
See application file for complete search history.

(56) References Cited

U.S. PATENT DOCUMENTS

| | | | |
|---|---|---|---|
| 2,041,235 A | 5/1936 | Darbaker | |
| 2,058,447 A | 10/1936 | Hazelett | |
| 2,058,448 A | 10/1936 | Hazelett | |
| RE21,260 E | 11/1939 | Hazelett | |
| 2,334,109 A | 11/1943 | McBain et al. | |
| 2,448,009 A | 8/1948 | Baker | |
| 2,448,012 A | 8/1948 | Baker | |
| 2,481,172 A | 9/1949 | Staggs | |
| 2,527,237 A | 10/1950 | Wilcox, Jr. | |
| 2,566,274 A | 8/1951 | White et al. | |
| 2,722,589 A | 11/1955 | Marquardt | |
| 2,731,212 A | 1/1956 | Baker | |
| 2,753,474 A | 7/1956 | Walworth et al. | |
| 2,769,932 A | 11/1956 | Zozulin et al. | |
| 2,895,034 A | 7/1959 | Baffrey et al. | |
| 2,912,552 A | 11/1959 | Baermann | |
| 3,008,026 A | 11/1961 | Kennedy | |
| 3,272,956 A * | 9/1966 | Baermann | C21D 1/42 219/645 |
| 3,376,120 A | 4/1968 | Hiegel | |
| 3,438,231 A | 4/1969 | Petzschke | |
| 3,444,346 A | 5/1969 | Russell et al. | |
| 3,453,847 A | 7/1969 | Romanauskas | |
| 3,535,902 A | 10/1970 | Sevenich et al. | |
| 3,562,470 A | 2/1971 | Bobart et al. | |
| 3,604,696 A | 9/1971 | Coleman et al. | |
| 3,635,417 A | 1/1972 | Kajiwara et al. | |
| 3,793,867 A | 2/1974 | Stafford | |
| 3,837,391 A | 9/1974 | Rossi | |
| 4,054,770 A | 10/1977 | Jackson et al. | |
| 4,185,183 A | 1/1980 | Kamimoto | |
| 4,214,467 A | 7/1980 | Sankaran | |
| 4,296,919 A * | 10/1981 | Sakurai | C21D 9/56 266/102 |
| 4,321,444 A | 3/1982 | Davies | |
| 4,448,614 A | 5/1984 | Morimoto et al. | |
| 4,708,325 A | 11/1987 | Georges | |
| 4,730,781 A | 3/1988 | Richter et al. | |
| 4,743,196 A * | 5/1988 | Imose | C21D 9/56 266/103 |
| 4,761,527 A | 8/1988 | Mohr | |
| 4,795,872 A | 1/1989 | Hagisawa et al. | |
| 4,828,227 A | 5/1989 | Georges et al. | |
| 4,891,484 A | 1/1990 | Waggott et al. | |
| 4,923,396 A * | 5/1990 | Harada | C21D 9/56 266/102 |
| 5,397,877 A | 3/1995 | Couffet et al. | |
| 5,401,941 A | 3/1995 | Mauve et al. | |
| 5,701,775 A | 12/1997 | Sivilotti et al. | |
| 5,739,506 A | 4/1998 | Hanton et al. | |
| 5,914,056 A | 6/1999 | Yamaguchi | |
| 5,914,065 A | 6/1999 | Alavi | |
| 6,011,245 A | 1/2000 | Bell | |
| 6,019,200 A | 2/2000 | Janzen et al. | |
| 6,129,136 A | 10/2000 | Tibbs et al. | |
| 6,264,765 B1 | 7/2001 | Bryant et al. | |
| 6,285,015 B1 | 9/2001 | Doizaki et al. | |
| 6,327,883 B1 | 12/2001 | Noe et al. | |
| 6,570,141 B2 | 5/2003 | Ross | |
| 6,576,878 B2 | 6/2003 | Thorpe et al. | |
| 7,525,073 B2 | 4/2009 | Lovens et al. | |
| 7,671,307 B2 | 3/2010 | Nikanorov et al. | |
| 7,819,356 B2 | 10/2010 | Takatsuka et al. | |
| 7,942,191 B2 | 5/2011 | Zhang et al. | |
| 8,502,122 B2 | 8/2013 | Hirota | |
| 8,592,735 B2 | 11/2013 | Hirota | |
| 9,462,641 B2 | 10/2016 | Akers | |
| 10,370,749 B2 | 8/2019 | Hobbis et al. | |
| 2006/0037989 A1 | 2/2006 | Zilkenat et al. | |
| 2006/0070689 A1 | 4/2006 | Kropfl | |
| 2007/0193322 A1 | 8/2007 | Beck et al. | |
| 2009/0026303 A1 | 1/2009 | Schmitz et al. | |
| 2009/0101636 A1 | 4/2009 | Lovens et al. | |
| 2010/0050730 A1 | 3/2010 | Buschsieweke et al. | |
| 2010/0237548 A1 | 9/2010 | Okada et al. | |
| 2012/0074132 A1 | 3/2012 | Chen et al. | |
| 2014/0147697 A1 | 5/2014 | Berkhout et al. | |
| 2016/0016215 A1 | 1/2016 | Brown et al. | |
| 2018/0085803 A1 | 3/2018 | Hobbis et al. | |
| 2018/0085805 A1 | 3/2018 | Pralong et al. | |
| 2018/0085810 A1 | 3/2018 | Malpica et al. | |
| 2018/0087122 A1 | 3/2018 | Custers | |
| 2018/0092163 A1 | 3/2018 | Pralong et al. | |
| 2018/0092164 A1 | 3/2018 | Gaensbauer et al. | |

FOREIGN PATENT DOCUMENTS

| | | |
|---|---|---|
| CN | 201596682 u | 10/2010 |
| DE | 857787 C | 12/1952 |
| DE | 1163760 B | 2/1964 |
| DE | 102006054383 A1 | 5/2008 |
| EA | 012474 B1 | 10/2009 |
| EP | 1221826 B1 | 2/2006 |

(56) References Cited

FOREIGN PATENT DOCUMENTS

| | | | |
|---|---|---|---|
| EP | 1604549 B1 | 8/2006 | |
| EP | 2112863 A1 | 10/2009 | |
| EP | 2157193 A1 | 2/2010 | |
| EP | 2233593 A2 | 9/2010 | |
| EP | 2434836 A2 | 3/2012 | |
| EP | 2478974 A1 | 7/2012 | |
| EP | 2800452 B1 | 7/2016 | |
| FR | 1347484 A | 12/1963 | |
| FR | 1387653 A | 1/1965 | |
| FR | 2780846 A1 | 9/2000 | |
| GB | 167545 A | 8/1921 | |
| GB | 600673 A | 4/1948 | |
| GB | 609718 A | 10/1948 | |
| GB | 988334 A | 4/1965 | |
| GB | 2114101 A | 8/1983 | |
| GB | 2121260 A | 12/1983 | |
| JP | S4934459 A | 3/1974 | |
| JP | S51-68460 A | 6/1976 | |
| JP | S56102567 A | 8/1981 | |
| JP | S58193351 A | 11/1983 | |
| JP | S6486474 A | 3/1989 | |
| JP | H02209457 A | 8/1990 | |
| JP | H0375344 A | 3/1991 | |
| JP | H0375345 A | 3/1991 | |
| JP | H04112485 | * 4/1992 | .............. H05B 6/32 |
| JP | H04112485 A | 4/1992 | |
| JP | H05-76932 A | 3/1993 | |
| JP | 0527041 | 4/1993 | |
| JP | H0582248 A | 4/1993 | |
| JP | H0549117 U | 6/1993 | |
| JP | h07328719 | 12/1995 | |
| JP | H09-122752 A | 5/1997 | |
| JP | 2002529245 | 9/2002 | |
| JP | 2016141843 A | 8/2016 | |
| KR | 20120116988 A | 10/2012 | |
| RU | 1784319 A1 | 12/1992 | |
| RU | 2333065 c2 | 9/2008 | |
| RU | 97889 u1 | 9/2010 | |
| RU | 2504574 c2 | 1/2014 | |
| RU | 2539962 C2 | 1/2015 | |
| SU | 1005958 A | 3/1983 | |
| SU | 1316725 A1 | 6/1987 | |
| WO | 2007138152 A1 | 12/2007 | |
| WO | 2010091865 | 8/2010 | |
| WO | 2012/084638 A1 | 6/2012 | |
| WO | 2015094482 A1 | 6/2015 | |
| WO | 2016035867 A1 | 3/2016 | |
| WO | 2016035893 A1 | 3/2016 | |

OTHER PUBLICATIONS

The Aluminum Association, Inc., "International Alloy Designations and Chemical Composition Limits for Wrought Aluminum and Wrought Aluminum Alloys," Registration Record Series: Teal Sheets, Feb. 1, 2009, 35 pages, The Aluminum Association, Inc.
Australian Patent Application No. 2017336561 , "First Examination Report", dated Sep. 3, 2019, 3 pages.
Zerbetto , "Optimal Design of a Permanent Magnet Heater for Aluminum Billets", 2014 Flux Conference, Inovalab s.r.l., Oct. 15, 2014, 23 pages.
Canadian Patent Application No. 3,037,759, "Office Action" , Feb. 7, 2020, 4 pages.
Japanese Patent Application No. 2019-537057 , "Office Action", Apr. 28, 2020, 8 pages.
Application No. IN201917010873 , "First Examination Report", dated Jul. 15, 2020, 5 pages.
Application No. KR10-2019-7010990 , Office Action, dated Jul. 25, 2020, 15 pages.

* cited by examiner

COMPACT CONTINUOUS ANNEALING SOLUTION HEAT TREATMENT

CROSS REFERENCE TO RELATED APPLICATIONS

The present application claims the benefit of U.S. Provisional Patent Application No. 62/400,426 entitled "ROTATING MAGNET HEAT INDUCTION" and filed on Sep. 27, 2016; and U.S. Provisional Patent Application No. 62/505,948 entitled "ROTATING MAGNET HEAT INDUCTION" and filed on May 14, 2017, the disclosures of which are hereby incorporated by reference in their entireties.

Additionally, the present application is related to U.S. Non-provisional patent application Ser. No. 15/716,887 to Antoine Jean Willy Pralong, et al. entitled "ROTATING MAGNET HEAT INDUCTION" filed Sep. 27, 2017; U.S. Non-provisional patent application Ser. No. 15/716,559 to Antoine Jean Willy Pralong, et al. entitled "SYSTEMS AND METHODS FOR NON-CONTACT TENSIONING OF A METAL STRIP" filed Sep. 27, 2017; U.S. Non-provisional patent application Ser. No. 15/716,577 to David Michael Custers entitled "PRE-AGEING SYSTEMS AND METHODS USING MAGNETIC HEATING" filed Sep. 27, 2017; U.S. Non-provisional patent application Ser. No. 15/716,692 to David Anthony Gaensbauer, et al. entitled "MAGNETIC LEVITATION HEATING OF METAL WITH CONTROLLED SURFACE QUALITY" filed Sep. 27, 2017; and U.S. Non-provisional patent application Ser. No. 15/717,698 to Andrew James Hobbis, et al. entitled "SYSTEMS AND METHODS FOR THREADING A HOT COIL ON MILL" filed Sep. 27, 2017, the disclosures of which are hereby incorporated by reference in their entireties.

TECHNICAL FIELD

The present disclosure relates to metallurgy generally and more specifically to heat treating metal articles, such as aluminum metal strips.

BACKGROUND

Various metals, such as aluminum alloys, are used extensively for various purposes, such as automotive components, structural components, and many other uses. Traditionally, metals are either direct chill cast or continuously cast. Often, a metal ingot, slab, or strip is rolled to a final gauge that is deliverable to a customer (e.g., automotive manufacturer or part processing plant). In some cases, metals may need to undergo some sort of thermal treatment to achieve desirable temper properties. For example, annealing can improve formability of a metal article and solution heat treatment can improve strength of the metal article.

Annealing and solution heat treatment involve heating and cooling the metal article to specific temperatures and holding at those temperatures for specific durations of time. The temperature-time profile of a metal article can greatly affect the resulting strength and ductility of the metal article. In some cases, solution heat treatment of aluminum alloys can involve heating the metal article at a high temperature until precipitated alloying elements are dissolved in solid solution in the metal article, then quenching the metal article to lock these elements in a supersaturated solid solution. After solution heat treatment, the metal can be hardened at room temperature (e.g., naturally aged) for a duration, hardened for a duration at a slightly elevated temperature (e.g., artificially aged or pre-aged), and/or otherwise further processed (e.g., cleaned, pretreated, coated, or otherwise processed).

To achieve high volume throughput, metal articles can be continuously annealed and solution heat treated in a continuous processing line. Traditionally, such continuous processing lines occupy very large buildings and require expensive and complicated equipment. For example, some such continuous annealing solution heat treat lines require passing a metal strip through numerous sections to sufficiently raise the temperature of the metal strip and keep it at a solutionizing temperature, sometimes requiring lines of up to 800 meters or longer. Often, low tension must be maintained while the metal strip is at high temperatures, lest the metal strip deform under the tension and temperature, thus requiring the use of forced air to keep the metal strip appropriately suspended in the various sections so the metal strip does not inadvertently contact any surrounding equipment or structures. If the metal strip makes physical contact with equipment or structures, it may damage the equipment or structure, as well as damage the surface of the metal strip, necessitating a shutdown and scrapping of the damaged metal strip, as well as any metal in the 800 meter processing line that is affected and any metal necessary to start up a new processing run (e.g., another 800 meters or more). Additionally, to maintain desired temperatures, the forced air used to suspend the metal strip must be heated as well.

Current technology for performing continuous heat treatment on a metal strip involves the use of substantial equipment, substantial energy (e.g., to heat up large volumes of hot air), and substantial space (e.g., to house the 800 meters or more of equipment and supporting equipment).

SUMMARY

The term embodiment and like terms are intended to refer broadly to all of the subject matter of this disclosure and the claims below. Statements containing these terms should be understood not to limit the subject matter described herein or to limit the meaning or scope of the claims below. Embodiments of the present disclosure covered herein are defined by the claims below, not this summary. This summary is a high-level overview of various aspects of the disclosure and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this disclosure, any or all drawings and each claim.

Aspects of the present disclosure include a heat treatment line, comprising: a heating zone for accepting a metal strip moving in a downstream direction, the heating zone comprising a plurality of magnetic rotors for inducing eddy currents in the metal strip to heat the metal strip to a peak metal temperature, wherein each of the plurality of magnetic rotors rotates about an axis of rotation perpendicular the downstream direction and parallel a lateral width of the metal strip; a soaking zone positioned downstream of the heating zone for accepting the metal strip and maintaining the peak metal temperature for a duration; and a quenching zone positioned downstream of the soaking zone for rapidly quenching the metal strip from the peak metal temperature. In some cases, the heat treatment line further includes a reheating zone after the quenching zone to pre-age the metal strip before it is coiled into a final coil.

In some cases, the plurality of magnetic rotors includes a plurality of magnetic rotor pairs, wherein each of the magnetic rotor pairs include a bottom magnetic rotor positioned opposite the metal strip from a top magnetic rotor. In some cases, each of the plurality of magnetic rotors comprises a plurality of permanent magnets positioned to rotate about the axis of rotation. In some cases, the soaking zone includes an additional plurality of magnetic rotors for levitating the metal strip, wherein each of the additional plurality of magnetic rotors rotates about an axis of rotation perpendicular the downstream direction and parallel the lateral width of the metal strip. In some cases, the soaking zone further comprises chamber walls positioned between the metal strip and the additional plurality of magnetic rotors, wherein the chamber walls define a chamber for accepting the metal strip, wherein the chamber is couplable to a supply of gas. In some cases, the chamber walls are non-metallic. In some cases, the soaking zone further comprises one or more cooling devices for offsetting temperature increases induced in the metal strip by rotation of the additional plurality of magnetic rotors. In some cases, the heat treatment line further comprises an uncoiler positioned upstream the heating zone for providing the metal strip to the heating zone from a coil; a leveling roller positioned downstream of the quenching zone for controlling flatness of the metal strip; and a reheating zone positioned downstream of the leveling roller for heating the metal strip, wherein the reheating zone includes one or more additional magnetic rotors. In some cases, the reheating zone is positioned after the quenching zone to pre-age the metal strip before recoiling the metal strip into a final coil. In some cases, the heat treatment line further comprises a tension adjustment zone for adjusting tension in the metal strip, wherein the tension adjustment zone comprises one or more magnetic rotors rotatable about an axis of rotation perpendicular the downstream direction and parallel the lateral width of the metal strip. In some cases, the heat treatment line further comprises an uncoiler positioned upstream the heating zone for providing the metal strip to the heating zone from a starter coil and a recoiler positioned downstream the quenching zone for receiving the metal strip after heat treatment and coiling the metal strip onto an ending coil; wherein a passline is defined between the uncoiler and the recoiler along which the metal strip passes through the heating zone, the soaking zone, and the quenching zone without passing through an accumulator. In some cases, the heat treatment line further comprises a moving welder or other joiner positioned upstream of the heating zone for welding or otherwise joining a subsequent metal strip to the metal strip during travel of the metal strip.

Aspects of the present disclosure include a method of continuous heat treatment, comprising: passing a metal strip adjacent a plurality of magnetic rotors in a downstream direction; rotating the plurality of magnetic rotors, wherein rotating a magnetic rotor includes rotating the magnetic rotor about an axis of rotation perpendicular the downstream direction and parallel a lateral width of the metal strip, and wherein rotating the plurality of magnetic rotors induces eddy currents in the metal strip to heat the metal strip to a peak metal temperature; passing the metal strip through a soaking zone, wherein passing the metal strip through the soaking zone comprises maintaining the peak metal temperature of the metal strip for a duration; and quenching the metal strip from the peak metal temperature.

In some cases, the plurality of magnetic rotors includes a plurality of magnetic rotor pairs, wherein each of the magnetic rotor pairs include a bottom magnetic rotor and a top magnetic rotor separated by a gap, and wherein passing the metal strip adjacent the plurality of magnetic rotors comprises passing the metal strip through gaps of the plurality of magnetic rotor pairs. In some cases, rotating a magnetic rotor of the plurality of magnetic rotors includes rotating a plurality of permanent magnets about the axis of rotation. In some cases, passing the metal strip through the soaking zone comprises levitating the metal strip, and wherein levitating the metal strip comprises rotating an additional plurality of magnetic rotors adjacent the metal strip. In some cases, passing the metal strip through the soaking zone comprises: passing the metal strip through a chamber defined by chamber walls positioned between the metal strip and the additional plurality of magnetic rotors; and supplying gas to the chamber from a supply of gas. In some cases, maintaining the peak metal temperature comprises applying a cooling fluid to the metal strip to offset temperature increases induced in the metal strip by rotation of the additional plurality of magnetic rotors. In some cases, the method further includes uncoiling the metal strip from a starter coil; leveling the metal strip after quenching the metal strip; and reheating the metal strip after leveling the metal strip, wherein reheating the metal strip comprises rotating one or more additional magnetic rotors adjacent the metal strip. In some cases, the method further comprises threading the metal strip, wherein threading the metal strip comprises: rotating magnetic rotors in a downstream direction, wherein the magnetic rotors are selected from the group consisting of the plurality of magnetic rotors and an additional set of magnetic rotors; passing an end of the metal strip by the magnetic rotors; and reversing rotation of the magnetic rotors to rotate the magnetic rotors in an upstream direction. In some cases, the method further comprises uncoiling the metal strip from a starter coil prior to passing the metal strip adjacent the plurality of magnetic rotors; recoiling the metal strip into an ending coil after quenching the metal strip, wherein the metal strip in the ending coil has been heat treated; and not passing the metal strip through an accumulator between uncoiling the metal strip and recoiling the metal strip. In some cases, the method further comprises welding or otherwise joining the metal strip to a subsequent metal strip, wherein welding or otherwise joining the metal strip comprises: abutting the metal strip and the subsequent metal strip at a joint during travel of the metal strip; passing a moving welder or other joiner over the joint during travel of the metal strip; and welding/joining the joint during travel of the metal strip.

Other objects and advantages will be apparent from the following detailed description of non-limiting examples.

BRIEF DESCRIPTION OF THE DRAWINGS

The specification makes reference to the following appended figures, in which use of like reference numerals in different figures is intended to illustrate like or analogous components.

DETAILED DESCRIPTION

Figure 1:
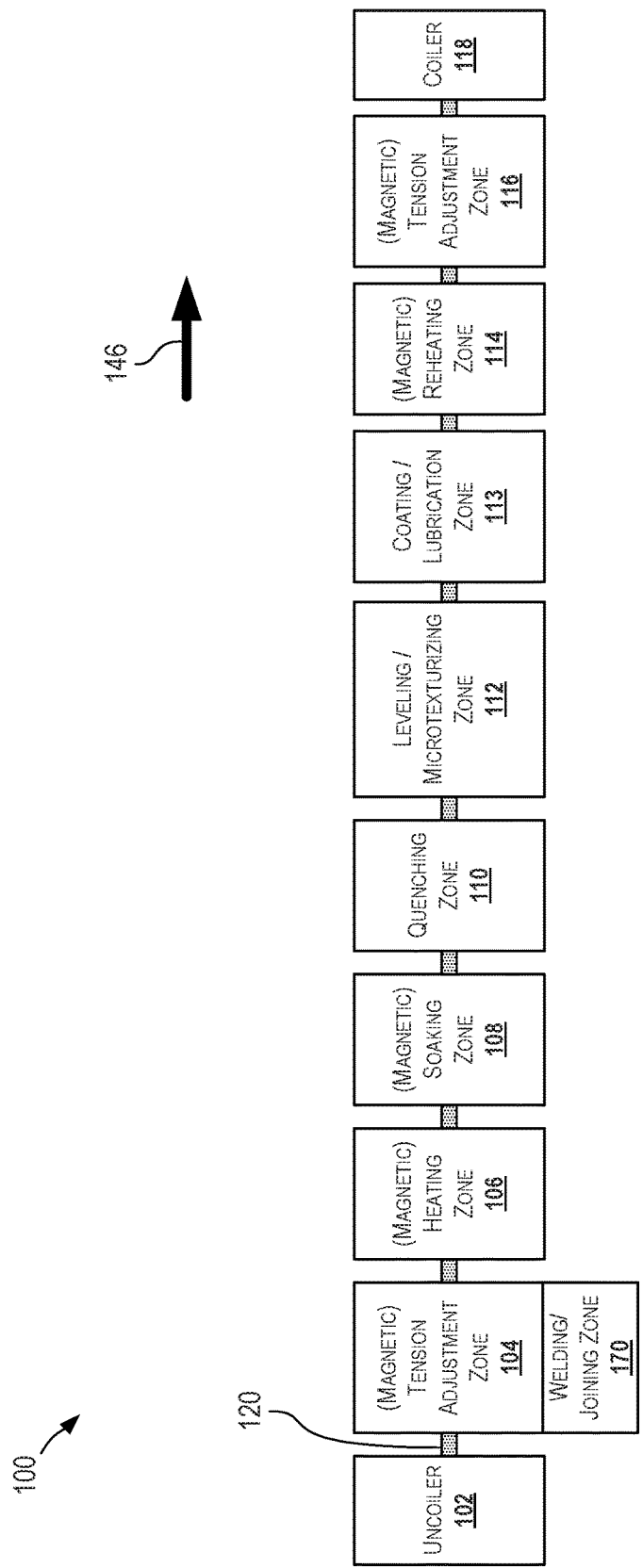
FIG. 1 is a representational schematic diagram depicting a processing line for continuous heat treatment according to certain aspects of the present disclosure.

Certain aspects and features of the present disclosure relate to a compact heat treatment line that includes a short heating zone capable of rapidly bringing the metal strip to a suitable solutionizing temperature through the use of magnetic rotors, such as permanent magnet magnetic rotors. A fast and efficient soaking zone can be achieved as well, such as through the use of magnetic rotors to levitate the metal strip within a gas-filled chamber. Magnetic rotors can further levitate the metal strip through a quenching zone, and can optionally reheat the metal strip prior to final coiling. Magnetic rotors used to heat and/or levitate the metal strip can also provide tension control and can facilitate initial threading of the metal strip. Such a heat treatment line can provide continuous annealing and solution heat treating in a much more compacted space than traditional processing lines.

The compact heat treatment line can be a compact continuous annealing and solution heat treat (CASH) line, capable of solutionizing and/or annealing a continuous metal strip. After the metal strip has been heat treated in the heat treatment line, the metal strip can have a desirable temper, such as a T temper (e.g., T4, T6 or T8). Certain aspects of the present disclosure may be especially useful for heat treating an aluminum metal strip. In some cases, thicker or thinner metal articles can be processed other than a metal strip. As used herein, reference to a metal strip with respect to certain aspects and features of the present disclosure can be replaced with reference to a metal article or any specific thicker or thinner metal articles, as appropriate. In some cases, certain aspects of the present disclosure can be especially useful for heat treating a metal strip that is approximately 1 mm in thickness, approximately 0.2 mm to approximately 6 mm, approximately 0.5 mm to approximately 3 mm, or approximately 0.7 mm to approximately 2 mm.

While normal CASH lines may require large footprints and have a processing length (e.g., length through which the metal strip travels in the CASH line) that extends to approximately 800 meters or beyond, certain aspects of the present disclosure can occupy a smaller footprint and have a processing length that is at or less than approximately 100 meters, approximately 90 meters, approximately 80 meters, approximately 70 meters, approximately 60 meters, approximately 50 meters, approximately 40 meters, approximately 30 meters, approximately 25 meters, approximately 20 meters, or approximately 15 meters. In some cases, a heat treatment line as disclosed herein can be positioned in a horizontal direction, with the metal strip travelling primarily in a horizontal direction. However, that need not be the case, and one or more elements of the heat treatment line can direct the metal strip in a vertical or other direction.

A heat treatment line can include a heating zone, a soaking zone, and a quenching zone. In some cases, the heat treatment line can also include a reheating zone. In some cases, other zones and/or elements can be used as well, such as any combination of an uncoiler, a first tension adjustment zone, a leveling and/or microtexturizing zone, a coating and/or lubrication zone, a second tension adjustment zone, and a coiler. In some cases, the heat treatment line can include other zones and/or elements, as well, such as flatteners, joiners, notches, levelers, lubricators, and coasters.

Certain aspects and features of the present disclosure make use of magnetic rotors. A magnetic rotor can rotate about an axis of rotation. The rotating magnets can be rotated through any suitable method, including through a rotor motor (e.g., electric motor, pneumatic motor, or otherwise) or sympathetic movement of a nearby magnetic source (e.g., another rotating magnet or changing magnetic field). A source of rotational power can be directly or indirectly coupled to a magnetic rotor to rotate the magnetic rotor. The axis of rotation of a magnetic rotor can be in any suitable direction, although it can be advantageous to position an axis of rotation approximately parallel to a lateral width of the metal strip and approximately perpendicular to a longitudinal axis (e.g., length) of the metal strip or approximately perpendicular to a downstream direction of the processing line.

Approximately perpendicular can include perpendicular or within 1°, 2°, 3°, 4°, 5°, 6°, 7°, 8°, 9°, or 10° of perpendicular, or similar, as appropriate. Positioning an axis of rotation in this fashion can be useful for controlling tension in the metal strip. Tension management can be very important in successfully processing metal articles (e.g., metal strip) in a controlled manner in a processing line.

A magnetic rotor can include one or more magnetic sources, such as electromagnets or permanent magnets. For example, a single rotor can include a single magnetic source and thus contain two magnetic poles, or a single rotor can include multiple magnetic sources and thus contain multiple magnetic poles. In some cases, the magnetic sources of a single rotor can be arranged to produce directionally asymmetric magnetic fields, such as permanent magnet magnetic sources arranged in a Halbach array for directing magnetic fields out from an outer circumference of the magnetic rotor. Magnetic rotors can generally contain only permanent magnets, although in some cases rotating magnets can instead contain electromagnets or a combination of electromagnets and permanent magnets. Permanent magnet magnetic rotors may be preferable in some cases and may be able to achieve more efficient results than magnetic rotors relying on electromagnets. The magnetic sources can extend the full width of the magnetic rotor or less than the full width of the magnetic rotor. In some cases, a magnetic rotor can include laterally spaced-apart magnetic sources. Laterally spaced-apart magnetic sources can thus include a gap in the width of the magnetic rotor where no magnetic sources reside. A magnetic rotor with laterally spaced-apart magnetic sources can include a magnetic rotor having two or more arrays of magnetic sources that are laterally spaced-apart from one another, with each array containing one or more magnetic sources. Magnetic rotors with laterally spaced-apart magnetic sources can be especially efficient at levitating a metal strip while minimizing an amount of heat induced in the metal strip.

Rotational movement of a magnetic rotor causes its magnet source(s) to induce a moving or changing magnetic field adjacent the magnetic rotor through which a metal strip can pass. When used in a pair with an upper rotor and a lower rotor, the pair of magnetic rotors can define a gap between the upper rotor and the lower rotor in which the changing magnetic field is generated and through which the metal strip may pass. When used as a single magnetic rotor, the metal strip may pass adjacent the magnetic rotor within an effective distance of the magnetic rotor within which the changing magnetic field generated by the magnetic rotor provides a desirable effect. As used herein, the term "an array of magnetic rotors" can include a single magnetic rotor, a single pair of magnetic rotors, two or more magnetic rotors, or two or more pairs of magnetic rotors.

Magnetic rotors can be used on any suitable article capable of generating eddy currents in the presence of moving and time varying magnetic fields. In some cases, the magnetic rotors disclosed herein may be used with conductive materials, including aluminum, aluminum alloys, magnesium, magnesium-based materials, titanium, titanium-based materials, copper, copper-based materials, steel, steel-based materials, bronze, bronze-based materials, brass, brass-based materials, composites, sheets used in composites, or any other suitable metal, non-metal or combination of materials. The article may include monolithic materials, as well as non-monolithic materials such as roll-bonded materials, clad materials, composite materials (such as but not limited to carbon fiber-containing materials), or various other materials. In one non-limiting example, the magnetic rotors can be used to heat metal articles such as aluminum metal strips, slabs or other articles made from aluminum alloys, including aluminum alloys containing iron. Magnetic rotors can be used to heat and/or levitate a metal article, such as a metal strip. As a metal article passes through the changing magnetic field generated by a rotating magnetic rotor, eddy currents can be generated or induced in the metal article. These eddy currents can thus heat the metal article as they flow through the resistance of the metal article. Additionally, eddy currents generated in the metal article can create magnetic fields that oppose the magnetic fields from the magnetic rotors, thus creating a repulsion that can be used to levitate the metal article. In addition to heating and/or levitating the metal article, magnetic rotors can be used to control tension in the metal strip, and direct movement of the metal strip in a downstream direction.

Magnetic rotors can be controlled in various ways, such as through manipulation of various factors associated with the magnetic rotors, including strength of magnetic sources, number of magnetic sources, orientation of magnetic sources, size of magnetic sources, size of the rotating magnet itself (e.g., including any shell), speed of the rotating magnet (e.g., rotational speed), vertical gap between vertically offset magnetic rotors (e.g., vertically offset rotors in a single rotor set), laterally offset placement of vertically offset magnetic rotors (e.g., laterally offset placement of rotors in a single rotor set), longitudinal gap between adjacent magnetic rotors, thickness of the metal strip, vertical distance between each rotating magnet and the metal strip, composition of the metal strip, presence of magnetic shielding (e.g., certain flux focusing or shielding elements), thickness of and/or permeability of magnetic shielding, forward speed of the metal strip, and number of magnetic rotors used. Other factors can be controlled as well. Control of these and other factors can be static (e.g., set before a heat treating process) or dynamic (e.g., changeable on-the-fly during a heat treatment process). In some cases, control of one or more of the aforementioned factors, among others, can be based on a computer model, operator feedback, or automatic feedback (e.g., based on signals from real-time sensors). A controller can be operationally coupled (e.g., by wire or wireless connection) to magnetic rotors to dynamically adjust tension in the metal strip, speed of the metal strip, or other aspects of the metal strip's travel through the heat treatment line.

Control of magnetic rotors can enable control of tension in the metal strip. In some cases, control of magnetic rotors can enable control of speed of movement of the metal strip in a downstream direction. In some cases, precise control of tension and/or speed can be used to facilitate desirable heat treatment, such as by controlling an amount of time a metal strip spends in a heating and/or quenching zone, or more specifically the amount of time a metal strip spends at a desired temperature (e.g., a solutionizing temperature).

Magnetic rotors can rotate in a "downstream" direction or an "upstream" direction. As used herein, a magnetic rotor rotating in a downstream direction rotates such that the surface of the magnetic rotor nearest the metal strip at any point in time is moving in the direction of travel of the metal strip (e.g., generally towards the downstream direction). For example, when looking at a metal strip from the side with the metal strip moving in its longitudinal direction of travel to the right, a magnetic rotor positioned above the metal strip rotating in a downstream direction can rotate counterclockwise while a magnetic rotor positioned below the metal strip and rotating in a downstream direction can rotate clockwise. As used herein, a magnetic rotor rotating in an upstream direction rotates such that the surface of the magnetic rotor nearest the metal strip at any point in time is moving opposite the direction of travel of the metal strip (e.g., generally towards the upstream direction). For example, when looking at a metal strip from the side with the metal strip moving in its longitudinal direction of travel to the right, a magnetic rotor positioned above the metal strip rotating in an upstream direction can rotate clockwise while a magnetic rotor positioned below the metal strip and rotating in an upstream direction can rotate counterclockwise.

In a heating zone, the metal strip can be rapidly heated to a desired temperature, such as an annealing temperature or a solutionizing temperature. For example, for certain aluminum alloys, the heating zone can heat the metal strip to temperatures between 400° C. and 600° C., or more specifically to temperatures at or lower than approximately 560° C., 565° C., 570° C., 575° C., 580° C., 585° C., 590° C., 595° C., or 600° C., and even more desirably at approximately 565° C. In some cases, for certain aluminum alloys, the heating zone can heat the metal strip to temperatures between approximately 500° C. and 560° C. The metal strip can be levitated and/or supported by an array of magnetic rotors while within the heating zone. In some cases, however, one or more pairs of magnetic rotors can be used to simultaneously levitate and heat the metal strip. A pair of magnetic rotors can include an upper rotor positioned opposite the metal strip from a lower rotor. A gap can be defined between the pair of magnetic rotors. In some cases, a single pair of magnetic rotors can be capable of increasing a temperature of the metal strip by approximately 40° C. to approximately 80° C., approximately 50° C. to approximately 70° C., approximately 60° C. to approximately 70° C., or approximately 70° C. In some cases, a pair of magnetic rotors is capable of achieving these temperature increases as the metal strip is moving past the magnetic rotors at speeds of approximately 40-80 m/min, approximately 50-70 m/min, or approximately 60 m/min. Precise control of temperature increase in the metal strip can be achieved by controlling the changing magnetic field, such as by adjusting the speed of rotation of the magnetic rotors or the size of the gap between the magnetic rotors of the pair of magnetic rotors. Multiple pairs of magnetic rotors can be used sequentially to achieve a desired temperature increase. As used herein, reference to a temperature of the metal strip can include a peak metal temperature of the metal strip. The heating zone can include magnetic rotors to heat the metal strip and optionally additional magnetic rotors for levitating the metal strip. Magnetic rotors used specifically to levitate the metal strip can provide some degree of heating to the metal strip.

In some cases, additional heating devices can be used in the heating zone apart from magnetic rotors, either in place of the pairs of magnetic rotors or in addition to the pairs of magnetic rotors. Examples of additional heating devices can include induction coils, direct flame impingement devices, hot gas devices, infrared devices, or similar. In some cases, the additional heating devices can provide supplemental heating to the metal strip to achieve a desired temperature and/or to maintain a more even temperature distribution across a lateral width of the metal strip. For example, in some cases where magnetic rotors heat the metal strip, hot and/or cold spots may exist on the metal strip after passing the magnetic rotors, at which point supplemental heating devices can be used to heat the cold spots to even out the temperature distribution across the lateral width of the metal strip. In some examples, cooling devices can be used to cool the hot spots to even out the temperature distribution across the lateral width of the metal strip.

In some cases, non-rotating electromagnets can be used in the heating zone in addition to or instead of magnetic rotors. However, the use of magnetic rotors, as opposed to stationary electromagnets, to generate changing magnetic fields can provide improved efficiency, as well as more even heating of the metal strip. Using stationary electromagnets to vary inductive fields imparted across the width of the metal strip can generate localized hotspots in the metal strip. Inductive fields of various intensities can be caused by the natural variance in the windings of different stationary electromagnets. Variances in electromagnet windings can result in some locations generating more heat than adjacent lateral locations. Localized hotspots can unevenly deform the metal strip and can cause other manufacturing defects. By contrast, while permanent magnets may include some level of inherent magnetic variance across dimensions or from one magnet to another, some or all of this variance can be automatically averaged out due to the rotation of the magnetic sources in the magnetic rotor. No single permanent magnet is being held at any laterally stationary position, and thus an average magnetic field is being applied by the rotating permanent magnets. Thus, the rotating magnetic rotor is able to heat the metal strip evenly in a more controlled manner. When electromagnets are used in a rotating magnet heater, variances between different electromagnets can be averaged out due to rotation of the magnetic rotor. This averaging-out of the variances does not occur with stationary electromagnets.

A soaking zone can include a soaking furnace, such as a tunnel furnace or other suitable furnace. Within the soaking zone, the metal strip can be maintained at a desired temperature (e.g., solutionizing temperature) for a desired duration. Maintaining the temperature at the desired temperature can include keeping the temperature to within 6%, 7%, 8%, 9%, 10%, 11%, or 12% of the desired temperature, but preferably within 0.5%, 1%, 1.5%, 2%, 3%, 4%, 5%, or 6% of the desired temperature. The desired duration can depend on the alloy used, the type of result desired, and prior thermal mechanical processing steps, such as the method of casting the metal article or any cold or hot rolling performed on the metal article. For example, continuously cast metal articles may be able to achieve desirable results using a much shorter duration than a direct chill cast metal article. In some cases, the metal strip can be soaked for a duration between about 0 and about 40 seconds, or longer. In some cases, certain aspects and features of the present disclosure are especially useful with continuously cast metal articles. In some cases, a soaking zone can also facilitate bringing the metal strip up to the desired temperature.

Any suitable furnace can be used in the soaking zone to maintain the peak metal temperature of the metal strip, such as a hot air furnace, a magnetic-rotor-based furnace, an infrared furnace, or a combination thereof. For example, the soaking furnace can use heated gas to maintain the temperature of the metal strip. In some cases, an array of magnetic rotors can be used in addition to or instead of the heated gas to impart sufficient heat into the metal strip to maintain the temperature of the metal strip at the desired temperature.

The soaking zone can include an array of magnetic rotors for levitating the metal strip within the soaking zone. The array of magnetic rotors can impart some degree of heat into the metal strip. In some cases, this imparted heat can be used to maintain the temperature of the metal strip at the desired temperature. In some cases, such as if the magnetic rotors generate too much heat, the imparted heat can be offset through one or more cooling devices in the soaking zone. Examples of suitable cooling devices include coolant headers or coolant nozzles controllable to dispense a coolant fluid (e.g., liquid or gas) onto the metal strip. The coolant fluid can be dispensed at any temperature at or below the temperature desired to be maintained in the metal strip within the soaking zone. The cooling devices can be controllable to dispense coolant fluid as necessary to facilitate maintaining the temperature of the metal strip at the desired temperature throughout the soaking zone. In some cases, the soaking zone can have a length that is at or less than approximately 50 m, 40 m, 30 m, 20 m, 15 m, 10 m, or 5 m.

In some cases, the soaking zone can include a gas-filled chamber through which the metal strip passes. The gas-filled chamber can be large enough (e.g., in height) to enclose any surrounding magnetic rotors used to levitate the metal strip. However, the gas-filled chamber may preferably be sufficiently small in height to enclose the metal strip without enclosing any surrounding magnetic rotors. In some cases, the gas-filled chamber is approximately 50-250 mm in height, such as 50-200 mm or 100 mm, or anywhere in between. In some cases, the gas-filled chamber can be approximately 250 mm in height or greater. The gas-filled chamber can include chamber walls, such as an upper wall and a lower wall, as well as side walls, allowing the metal strip to continuously be fed into an upstream end of the chamber and continuously be fed out of a downstream end of the chamber. The chamber walls can be made of a non-conductive and heat-resistant material, such as Kevlar® or other para-aramids, or NOMEX® or other meta-aramids. The chamber walls, and more specifically the lower wall, can be positioned between the metal strip and the magnetic rotors used to levitate the metal strip within the soaking zone.

The chamber can include one or more ports for supplying gas to the chamber from a gas supply. In some cases, the ports can be arranged to allow the gas flowing into the chamber to provide additional support to levitate the metal strip. In some cases, the gas supply can feed gas into the chamber through one or more ends of the chamber. In some cases, an inert gas (e.g., nitrogen or argon) or minimally reactive gas (e.g., dry air) can be used within the chamber. In some cases, other gasses can be used, such as treatment gasses (e.g., methane or a silane gas to induce passivation of the surface of the metal strip). In some cases, the gas can be pre-heated to a desirable temperature to facilitate maintaining the desired temperature of the metal strip within the soaking zone, however in some cases the gas can be minimally pre-heated or not pre-heated. In some cases, hot gasses can be supplied to supplement heating from the rotating magnets. Such hot gasses can be inert or minimally reactive gasses. The hot gasses can be supplied through directed ports aimed at regions of the metal strip where magnetic heating does not fully heat the metal strip. The hot gasses can facilitate equalizing temperature in the metal article as well as providing an inert or minimally reactive atmosphere within the chamber.

In some cases, the chamber extends for a length that is equal or approximately equal the length of the soaking zone. In some cases, the chamber may extend at least partially into the heating zone. For example, in some cases, the metal strip may be located within the chamber when it is being heated by some or all of the pairs of magnetic rotors of the heating zone.

In some cases, especially when the temperature distribution across the lateral width of the metal strip is very even upon exiting the heating zone, the heat treatment line may include no soaking furnace. In such cases, the soaking zone may extend from a heating zone to a quenching zone with the metal strip exposed to ambient and/or room temperature air. An array of magnetic rotors can still be used to levitate the metal strip as it passes between the heating zone and the quenching zone. A soaking zone without a soaking furnace may still have a duration dependent upon the speed of travel of the metal strip and the length between the heating zone and the quenching zone.

In a quenching zone, coolant can be provided to the metal strip in any suitable fashion, such as through a quenching tank or bath or through the use of one or more coolant headers or nozzles (e.g., linear nozzles) to distribute coolant to the metal strip. Any suitable coolant can be used, such as a liquid (e.g., water), a gas (e.g., air), or a combination of the two. As used herein, providing coolant can include distributing coolant onto a metal strip or passing a metal strip through coolant. Coolant can be provided in a fashion sufficient to rapidly cool the peak metal temperature of the metal strip, such as at rates between approximately 50° C./s and 400° C./s, approximately 100° C./s and 300° C./s, and approximately 200° C./s. In some cases, the metal strip is rapidly cooled at rates greater than at least 200° C./s. In some cases, the metal strip can be quenched to a temperature at or near 250° C., although other temperatures can be used, such as a temperature between approximately 50° C. and 500° C. or between approximately 200° C. and 500° C. Control over the quenching that takes place in the quenching zone can be achieved by controlling the temperature and/or distribution of the coolant. For example, valves associated with (e.g., coupled to) the coolant headers and/or nozzles can provide control over the distribution of the coolant. In some cases, coolant headers or nozzles can be adjustable as a single unit across a lateral width of the metal strip, or individually adjustable at different locations along the lateral width of the metal strip (e.g., to distribute more coolant to certain portions of the metal strip than other portions).

Controller(s) and sensor(s) (e.g., non-contact temperature sensors) can be used at any suitable location along the heat treatment line to provide feedback control to the heat treatment line. Suitable locations can include within, adjacent to, upstream of, or downstream of one or more of any of the zones or elements of the heat treatment line. Any suitable controllers and/or sensors can be used. For example, temperature sensors located in, adjacent to, or immediately downstream of the heating zone can provide temperature information (e.g., signals) to a controller, which can use the temperature information to control any controllable aspects of the heating zone, such as speeds and/or gap height of pairs of magnetic rotors. Likewise, temperature sensors located in, adjacent to, or immediately downstream of the soaking zone can provide temperature information (e.g., signals) to a controller (e.g., the same or a different controller), which can use the temperature information to control any controllable aspects of the soaking zone, such as valves associated with coolant nozzles or coolant headers in the soaking zone. In another example, flatness sensors can be used after the quenching zone to provide flatness information (e.g., signals) to a controller (e.g., the same or a different controller), which can use the flatness information to improve flatness of the metal strip, such as through control of valves associated with coolant nozzles or coolant headers in the quenching zone.

In some cases, one or more coolant removal devices can be used to remove residual coolant from the metal strip upon exiting the quenching zone. Examples of suitable coolant removal devices include squeegees (such as rubber squeegees), air knives or other contact or non-contact coolant removal devices.

An array of magnetic rotors can be used to levitate the metal strip while within the quenching zone.

An uncoiler can be used upstream of the heating zone to unwind or uncoil a metal strip from an entry coil (e.g., a coil of metal strip to be passed through the heat treatment line). In some cases, the uncoiler can feed the metal strip past an unwrapping roller before the metal strip enters the heating zone. The unwrapping roller can include load cells for determining a tension in the metal strip. The load cells can be coupled to one or more controllers to provide feedback that can be used by the controllers to adjust tension in the metal strip as necessary. The metal strip exiting the uncoiler can be fed directly into a heating zone or can be first fed into a tension adjustment zone. In either the heating zone or in the tension adjustment zone, magnetic rotors can be used to control tension in the metal strip. For example, a magnetic rotor rotating in a downstream direction can apply downstream force on the metal strip, while a magnetic rotor rotating in an upstream direction can apply upstream force on the metal strip. Multiple magnetic rotors longitudinally spaced apart (e.g., sequentially spaced apart) can counteract some or all of any tension induced in the metal strip by one another. For example, a first magnetic rotor rotating to induce longitudinal tension in a metal strip can be spaced apart from a second magnetic rotor rotating in an opposite direction such that the longitudinal tension can be reduced or eliminated. Thus, tension in the metal strip can be controlled through control of the magnetic rotors, as described herein (e.g., through adjustment of position, speed, direction, strength, gap between opposing rotors of a pair of magnetic rotors, and other such parameters). When a tension adjustment zone is used, the tension adjustment zone can include an array of magnetic rotors used to levitate the metal strip. In some cases, the tension adjustment zone includes pairs of magnetic rotors designed to impart tension changes in the metal strip without significantly heating the metal strip, such as through the use of multiple laterally spaced-apart magnetic sources in a single magnetic rotor where the magnetic sources occupy less or substantially less than the full width of the magnetic rotor. In the tension adjustment zone, the tension in the metal strip can be gradually decreased from a starting tension (e.g., between the uncoiler and the beginning of the tension adjustment zone) to a low tension that may be especially desirable for heat treatment.

In some cases, a welding or joining zone exists between the uncoiler and the heating zone. In some cases, the welding or joining zone can be part of the tension adjustment zone. In the welding or joining zone, a moving welder or other joining device can be used to weld or join together ends of metal strips (e.g., a metal strip being processed and a subsequent metal strip) on the fly, while the metal strips are travelling through the heat treatment line. While magnetic rotors can be used to levitate the ends of the metal strips and direct the ends of the metal strips together, other equipment, such as contacting rollers and carriages, can be used as well. As the trailing end of the metal strip being processed is uncoiled from the entry coil, a leading end of a subsequent metal strip can be uncoiled from its own entry coil (e.g., using a second uncoiler) and directed towards the trailing end of the metal strip. In the welding or joining zone, the leading end of the subsequent metal strip and the trailing end of the metal strip can be brought together at a joint. The use of magnetic rotors or contacting devices (e.g., rollers or carriages) can help keep the ends of the metal strips held together or in close proximity. As the metal strips travel in the downstream direction, a welding or other joining device can be moved in the same downstream direction and at the same speed as the metal strips, allowing the welding or other joining device to maintain alignment with the joint as it welds or otherwise joins the joint. Any suitable joining device can be used, such as arc welders (e.g., gas metal arc welders or gas tungsten arc welders), fuel-based welders (e.g., oxyhydrogen welders), or other welders or joining devices. The welding or joining device can travel along a set of rails or can otherwise be suspended above or below the metal strip. In some cases, the welding or joining device can weld/join an entire lateral width of the metal strip at once. In some cases, the welding or joining device can also travel laterally as it welds/joins the metal strip. Since the magnetic rotors are capable of controlling the speed of travel of the metal strip, the magnetic rotors can slow the speed of travel of the metal strip during a welding or joining process. For example, under standard operating conditions, the metal strip may travel through the heat treatment line at speeds at or around 60 m/min, whereas during welding/joining, the metal strip may travel at speeds of approximately 5 m/min-20 m/min, approximately 7 m/min-15 m/min, or approximately 10 m/min.

In some cases, the heat treatment system can include a leveling and/or microtexturizing zone. The leveling and/or microtexturizing zone can include one or more rollers past which the metal strip is passed to level and/or texturize the metal strip. The metal strip can pass through a gap or nip between a pair of leveling and/or microtexturizing rollers. In some cases, the leveling and/or microtexturizing rollers can apply force on the metal strip sufficient to level and/or texturize the metal strip, but insufficient to reduce the thickness of the metal strip generally (e.g., reducing the thickness of the metal strip by at or less than 0.5%, 0.6%, 0.7%, 0.8%, 0.9%, or 1%). For example, the amount of force applied through the leveling and/or microtexturizing rollers can be below the yield strength of the metal strip. In some cases, force is applied through each leveling and/or microtexturizing roller from one or more work rolls. In some cases, the microtexturizing roller can have at least two different textures, which may or may not overlap. In some cases, a controller can be used to adjust the leveling and/or microtexturizing rollers to produce a desired leveling and/or microtexturizing result.

In some cases, the heat treatment line can include a coating and/or lubrication zone. The coating and/or lubrication zone can be located downstream of the quenching zone. In some cases, the coating and/or lubrication zone can be located downstream of a leveling and/or microtexturizing zone. In the coating and/or lubrication zone, a coating and/or lubrication can be applied to the metal strip. A coating and/or lubrication can be applied through any suitable technique, such as spray coating, roll coating, lamination, or other techniques.

In some cases, the heat treatment line can include a reheating zone. In some cases, the reheating zone is located downstream from a leveling and/or microtexturizing zone. In some cases, the reheating zone is located downstream from a coating and/or lubrication zone. The reheating zone can include one or more heating devices to raise the temperature of the metal strip after quenching in the quenching zone. In some cases, the one or more heating devices can include an array of magnetic rotors used to heat the metal strip. In some cases, the reheating zone can include an array of magnetic rotors (e.g., the same array for heating the metal strip or another array) for levitating the metal strip through the reheating zone. In some cases, when a reheating zone is positioned downstream of a coating and/or lubrication zone, the reheating zone can be used to cure a coating and/or facilitate lubricant flow applied in the coating and/or lubrication zone, such as by heating the metal strip sufficiently to cure the coating and/or facilitate lubricant flow from the heat of the metal strip. Heating the coating and/or lubricant from the metal strip can reduce the likelihood of damaging the coating or lubricant as may happen if overheating occurs, a risk in current gas-fired furnaces. In some cases, the reheating zone can raise the temperature of the metal strip to a pre-aging or artificially aging temperature in preparation for coiling the metal strip in a final coil and aging the metal strip while coiled. Such a pre-aging or artificially aging temperature can be a temperature of from about 60° C. to about 150° C. For example, the pre-aging treatment can be performed at a temperature of about 60° C., 65° C., 70° C., about 75° C., about 80° C., about 85° C., about 90° C., about 95° C., about 100° C., about 105° C., about 110° C., about 115° C., about 120° C., about 125° C., about 130° C., about 135° C., about 140° C., about 145° C., or about 150° C.

The heat treatment line can include a coiler used to wind or coil the metal strip into a final coil (e.g., a coil of heat treated metal strip). The coiler can be positioned at the downstream end of the heat treatment line. In some cases, such as when a moving welder/joiner is used to provide continuous heat treatment of consecutive metal strips, the coiler can include a cutter for cutting the metal strip, allowing the subsequent metal strip to be coiled separately from the metal strip. The cutter can include feedback equipment (e.g., cameras, distance sensors, or other sensors) to ensure the metal strips are separated as near the joint as possible.

In some cases, a final tension adjustment zone can be located immediately upstream of the coiler. The final tension adjustment zone can include an array of magnetic rotors to levitate the metal strip and assist in adjusting tension in the metal strip prior to coiling the metal strip. For example, while the magnetic rotors throughout the heat treatment line can attempt to minimize tension in the metal strip, at least within the heating zone, the final tension adjustment zone can act to increase tension as the metal strip enters the coiler. In some cases, the coiler can operate better when at least a minimum amount of tension is in the metal strip.

In some cases, magnetic rotors positioned throughout the heat treatment line can be used to facilitate threading of a metal strip into the heat treatment line. Rotation of the magnetic rotors in a downstream direction can act to increase tension in the metal strip and levitate the free end of the metal strip above any equipment or structures below the metal strip. In some cases, the free end of the metal strip can be guided through the heat treatment line by any suitable technique. In some cases, a carriage can be slidably located on rails extending past some or all of the heat treatment line. The carriage can support the free end of the metal strip and help guide it through the heat treatment line while the rotating magnets levitate the metal strip. Because the metal strip is levitated through the heat treatment line, it is possible to thread the entire heat treatment line with scraping much less of the metal strip than otherwise possible with conventional technology.

After threading has been completed, at least some of the magnetic rotors can reverse in rotational direction to rotate in an upstream direction, thus helping minimize the tensions within the metal strip. The ability for magnetic rotors to reverse in direction provides significant benefits to the ability for a metal strip to be threaded through the heat treatment line.

In some cases, threading can be facilitated by rotating upper magnetic rotors in a pair of magnetic rotors at a speed that is slightly higher than the speed of the lower magnetic rotors. This overspeeding can help counteract gravitational pull on the free end of the metal strip. In some cases, other techniques, such as forced air, can be used to counteract gravitational pull on the free end of the metal strip to avoid the metal strip curving around one of the magnetic rotors.

Certain aspects of a heat treatment line as disclosed herein can provide for the conveyance, levitation, and heating of metal strip in a non-contact manner—without contacting the metal strip or with minimally contacting the metal strip.

As used herein, the terms "above," "below," "upper," "lower," "vertical," and "horizontal" are used to describe relative orientations with respect to a metal article, such as a metal strip, as if the metal article were moving in a horizontal direction with its top and bottom surfaces generally parallel to the ground. The term "vertical" as used herein can refer to a direction perpendicular to a surface (e.g., top or bottom surface) of the metal article, regardless of the orientation of the metal article. The term "horizontal" as used herein can refer to a direction parallel to a surface (e.g., top or bottom surface) of the metal article, such as a direction parallel to the direction of travel of a moving metal article, regardless of the orientation of the metal article. The terms "above" and "below" can refer to locations beyond top or bottom surfaces of a metal article, regardless of the orientation of the metal article. However, when used with reference specifically to magnetic levitation, the term "below" can refer to locations closer to the gravitational pull of the earth. A metal strip can be processed in any suitable direction, including horizontal, vertical, or other directions, such as diagonal.

As used herein, the terms vertical, longitudinal, and lateral can be used with reference to the metal article being heated. The longitudinal direction can extend along a direction of travel of a metal article through processing equipment, such as along a passline through a continuous annealing solution heat treatment (CASH) line. The longitudinal direction can be parallel to the top and bottom surfaces of the metal article. The longitudinal direction can be perpendicular to the lateral direction and the vertical direction. The lateral direction can extend between the side edges of the metal article. The lateral direction can extend in a direction perpendicular to the longitudinal direction and the vertical direction. The vertical direction can extend between the top and bottom surfaces of the metal article. The vertical direction can be perpendicular to the longitudinal direction and the lateral direction.

Certain aspects and features of the present disclosure may be used with any suitable metal articles, such as in the form of foils, sheets, strips, slabs, plates, shates, or other metal articles. However, it may be preferable to use numerous aspects and features of the present disclosure with metal strips. The aspects and features of the present disclosure can be especially suitable for any metal article having flat surfaces (e.g., flat top and bottom surfaces). The aspects and features of the present disclosure can be especially suitable for any metal product having parallel or approximately parallel opposing surfaces (e.g., top and bottom surfaces). Approximately parallel can include parallel or within 1°, 2°, 3°, 4°, 5°, 6°, 7°, 8°, 9°, or 10° of parallel, or similar, as appropriate.

Aspects and features of the present disclosure can be used with metal articles of any suitable metal. In some cases, the metal article is aluminum, such as an aluminum alloy. In some cases, the metal article can be an aluminum alloy containing iron. Certain aspects and features of the present disclosure may be especially suitable for use with 6xxx or 5xxx series aluminum alloys, although other alloys such as 1xxx, 2xxx, 3xxx, 4xxx, 7xxx or 8xxx series alloys can be used. 6xxx and 5xxx series aluminum alloys can have conductivities of approximately 10,000,000 Siemens per meter (10 MS/m). In some cases, alloys having higher conductivities, such as 15 MS/m or 20 MS/m, can result in less efficient heating through rotating magnets, due at least in part to the generation of less secondary magnetic flux (e.g., magnetic flux generated by the metal article) to oppose the primary flux (e.g., magnetic flux generated by the rotating magnets).

The magnetic rotors can be positioned above or below the metal article (e.g., above or below the passline or above or below the chamber). As used herein, reference to an element being positioned with respect to the metal article can refer to that element being positioned with respect to a passline (e.g., desired passline along which the metal article is desired to travel), as appropriate. In some cases, the array of magnetic rotors for heating the metal article can include magnetic rotors positioned both below and above the metal article. In some cases, these magnetic rotors are placed in matched pairs, with similar magnetic rotors (e.g., similar or the same size, strength, rotation speed, and/or upstream or downstream rotation direction) placed directly opposite the passline from one another. When opposing magnetic rotors are placed on opposite sides of the metal article and spinning in the same downstream or upstream direction, one of the two magnetic rotors can be rotating in a clockwise direction while the other of the two magnetic rotors can be rotating in a counterclockwise direction.

The magnetic rotors can have a length that is approximately equal to or greater than the width of the metal article, with magnetic sources having a length that is approximately equal to or greater than the width of the metal article. In some cases, magnetic rotors and/or magnetic sources used for heating can be laterally displaced to occupy less than 100% of the lateral width of the metal strip. The magnetic rotors and/or magnetic sources in magnetic rotors used for levitating (e.g., magnetic rotors in the soaking zone) can occupy less than 100% of the lateral width of the metal strip, such as at or less than approximately 95%, 90%, 85%, 80%, 75%, 70%, 65%, 60%, 55%, 50%, 45%, 40%, 35%, 30%, 25%, 20%, 15%, or 10% of the lateral width of the metal strip. In some cases, a single magnetic rotor in the soaking zone can house two or more magnetic sources laterally spaced apart from one another. In some cases, the lateral position of magnetic sources within sequential magnetic rotors (e.g., longitudinally spaced apart and sequential magnetic rotors) used for levitation can be offset from one another, resulting in a staggered array of magnetic sources. The staggered nature of the magnetic sources can help minimize undesired and uneven heating during levitation of the metal strip.

In some cases, an array of magnetic rotors for levitating the metal strip may be positioned only below the metal strip, although that need not be the case. In some cases, magnetic rotors can be positioned above the metal strip to aid in directing or steering the metal strip. For example, magnetic rotors can be placed at or near the edges of the metal strip, including just past the edges of the metal strip, and rotated along an axis of rotation parallel to the longitudinal axis of the metal strip to induce forces towards a longitudinal centerline of the desired path through the heat treatment line or any particular zone or piece of equipment. These magnetic rotors can facilitate centering the metal strip. These centering magnetic rotors can be placed at any suitable location. In some cases, centering magnetic rotors can be used to stabilize the metal strip, especially when under low tension (e.g., within the heating zone and/or the soaking zone), or when the metal strip is under compression (e.g., adjacent the uncoiler and coilers).

In some cases, when magnetic rotors are used below and above the metal strip, the magnetic rotors positioned above the metal strip can be actuatable between a closed position and an open position. In the closed position, the magnetic rotors, and optionally any upper chamber walls (e.g., in the soaking zone), can be in position for normal operation. In the open position, any top magnetic rotors and/or upper chamber walls (e.g., in the soaking zone), can be moved away from a normal operating position to provide more room for a metal strip to be loaded or threaded into the heat treatment line. Once the metal strip has been loaded, any top magnetic rotors and/or any upper chamber walls, can be moved back to the closed position for normal operation.

In some cases, magnetic flux focusing elements can be used adjacent the magnetic rotors to redirect magnetic flux away from or towards certain regions. A magnetic flux focusing element can be any suitable material capable of redirecting magnetic flux, including concentrating magnetic flux. The magnetic flux focusing elements can receive magnetic flux from magnetic sources in the magnetic rotors that are not near or directly facing the article and redirect that magnetic flux towards the article (e.g., in a direction perpendicular to a top or bottom surface of the article). Magnetic flux focusing elements can also provide benefits of providing magnetic shielding between the magnetic rotor and adjacent equipment other than the metal article being heated. For example, magnetic flux focusing elements can allow adjacent, longitudinally offset, magnetic rotors to be placed closer to one another with less magnetic interaction between the two. Magnetic flux focusing elements can be made of any suitable material, including silicon alloyed steel (e.g., electrical steel). A magnetic flux focusing element may comprise multiple laminations. Magnetic flux focusing elements can be flux diverters, flux controllers or flux concentrators. When magnetic flux focusing elements are used, the magnetic rotors may be able to achieve efficient results at lower rotational speeds and the magnets may be able to be placed further from the metal article.

Certain aspects and features of the present disclosure provide a heat treatment line capable of providing faster heating than convection ovens, such as approximately five times faster than convection ovens, and with high energy efficiency (e.g., approximately 80% efficiency). Further, the magnetic rotors can provide nearly instant on/off control of heat. Additionally, certain aspects and features of the present disclosure provide the ability to float the metal strip throughout most, if not all, of the heat treatment line, including at least during heating and/or soaking of the metal strip, thus optimizing surface quality. Certain aspects and features of the present disclosure also are capable of providing various benefits in a very compact size. Not only can the longitudinal length of the heat treatment line be minimized due to rapid magnetic heating, but magnetic heating and levitation can permit a chamber containing the inert atmosphere to be very small, thus improving efficiency of gas usage. In some cases, certain aspects and features of the present disclosure are capable of providing other metallurgical benefits to the metal strip, such as reduced surface oxidation and faster dissolution or redistribution of intermetallic phases. In some cases, certain aspects and features of the present disclosure are capable of minimizing undesirable magnesium migration during certain heating processes.

In this description, reference is made to alloys identified by AA numbers and other related designations, such as "series" or "7xxx." For an understanding of the number designation system most commonly used in naming and identifying aluminum and its alloys, see "International Alloy Designations and Chemical Composition Limits for Wrought Aluminum and Wrought Aluminum Alloys" or "Registration Record of Aluminum Association Alloy Designations and Chemical Compositions Limits for Aluminum Alloys in the Form of Castings and Ingot," both published by The Aluminum Association.

As used herein, a plate generally has a thickness in a range of 5 mm to 50 mm. For example, a plate may refer to an aluminum product having a thickness of about 5 mm, 10 mm, 15 mm, 20 mm, 25 mm, 30 mm, 35 mm, 40 mm, 45 mm, or 50 mm.

As used herein, a shate (also referred to as a sheet plate) generally has a thickness of from about 4 mm to about 15 mm. For example, a shate may have a thickness of 4 mm, 5 mm, 6 mm, 7 mm, 8 mm, 9 mm, 10 mm, 11 mm, 12 mm, 13 mm, 14 mm, or 15 mm.

As used herein, a sheet generally refers to an aluminum product having a thickness of less than about 4 mm. For example, a sheet may have a thickness of less than 4 mm, less than 3 mm, less than 2 mm, less than 1 mm, less than 0.5 mm, less than 0.3 mm, or less than 0.1 mm.

Reference is made in this application to alloy temper or condition. For an understanding of the alloy temper descriptions most commonly used, see "American National Standards (ANSI) H35 on Alloy and Temper Designation Systems." An F condition or temper refers to an aluminum alloy as fabricated. An O condition or temper refers to an aluminum alloy after annealing. A T4 condition or temper refers to an aluminum alloy after solution heat treatment (i.e., solutionization) followed by natural aging. A T6 condition or temper refers to an aluminum alloy after solution heat treatment followed by artificial aging. A T7 condition or temper refers to an aluminum alloy after solution heat treatment and then followed by overaging or stabilizing. A T8 condition or temper refers to an aluminum alloy after solution heat treatment, followed by cold working and then by artificial aging. A T9 condition or temper refers to an aluminum alloy after solution heat treatment, followed by artificial aging, and then by cold working. An H1 condition or temper refers to an aluminum alloy after strain hardening. An H2 condition or temper refers to an aluminum alloy after strain hardening followed by partial annealing. An H3 condition or temper refers to an aluminum alloy after strain hardening and stabilization. A second digit following the HX condition or temper (e.g. H1X) indicates the final degree of strain hardening.

As used herein, the meaning of "room temperature" can include a temperature of from about 15° C. to about 30° C., for example about 15° C., about 16° C., about 17° C., about 18° C., about 19° C., about 20° C., about 21° C., about 22° C., about 23° C., about 24° C., about 25° C., about 26° C., about 27° C., about 28° C., about 29° C., or about 30° C. As used herein, the meaning of "ambient conditions" can include temperatures of about room temperature, relative humidity of from about 20% to about 100%, and barometric pressure of from about 975 millibar (mbar) to about 1050 mbar. For example, relative humidity can be about 20%, about 21%, about 22%, about 23%, about 24%, about 25%, about 26%, about 27%, about 28%, about 29%, about 30%, about 31%, about 32%, about 33%, about 34%, about 35%, about 36%, about 37%, about 38%, about 39%, about 40%, about 41%, about 42%, about 43%, about 44%, about 45%, about 46%, about 47%, about 48%, about 49%, about 50%, about 51%, about 52%, about 53%, about 54%, about 55%, about 56%, about 57%, about 58%, about 59%, about 60%, about 61%, about 62%, about 63%, about 64%, about 65%, about 66%, about 67%, about 68%, about 69%, about 70%, about 71%, about 72%, about 73%, about 74%, about 75%, about 76%, about 77%, about 78%, about 79%, about 80%, about 81%, about 82%, about 83%, about 84%, about 85%, about 86%, about 87%, about 88%, about 89%, about 90%, about 91%, about 92%, about 93%, about 94%, about 95%, about 96%, about 97%, about 98%, about 99%, about 100%, or anywhere in between. For example, barometric pressure can be about 975 mbar, about 980 mbar, about 985 mbar, about 990 mbar, about 995 mbar, about 1000 mbar, about 1005 mbar, about 1010 mbar, about 1015 mbar, about 1020 mbar, about 1025 mbar, about 1030 mbar, about 1035 mbar, about 1040 mbar, about 1045 mbar, about 1050 mbar, or anywhere in between. Ambient conditions can vary depending on the location such that what is "ambient" in one location can be different from what is "ambient" in another location. As such, ambient is not a fixed temperature or set range.

All ranges disclosed herein are to be understood to encompass any and all subranges subsumed therein. For example, a stated range of "1 to 10" should be considered to include any and all subranges between (and inclusive of) the minimum value of 1 and the maximum value of 10; that is, all subranges beginning with a minimum value of 1 or more, e.g. 1 to 6.1, and ending with a maximum value of 10 or less, e.g., 5.5 to 10. Unless stated otherwise, the expression "up to" when referring to the compositional amount of an element means that element is optional and includes a zero percent composition of that particular element. Unless stated otherwise, all compositional percentages are in weight percent (wt. %).

As used herein, the meaning of "a," "an," and "the" includes singular and plural references unless the context clearly dictates otherwise.

The alloys described herein can be cast using any suitable casting method known to those of ordinary skill in the art. As a few non-limiting examples, the casting process can include a direct chill (DC) casting process or a continuous casting (CC) process. The continuous casting system can include a pair of moving opposed casting surfaces (e.g., moving opposed belts, rolls or blocks), a casting cavity between the pair of moving opposed casting surfaces, and a molten metal injector. The molten metal injector can have an end opening from which molten metal can exit the molten metal injector and be injected into the casting cavity. In some cases, aspects of the present disclosure may be especially suitable for use with a continuous cast metal article.

The aluminum alloy products described herein can be used in automotive applications and other transportation applications, including aircraft and railway applications, or any other suitable application. For example, the disclosed aluminum alloy products can be used to prepare automotive structural parts, such as bumpers, side beams, roof beams, cross beams, pillar reinforcements (e.g., A-pillars, B-pillars, and C-pillars), inner panels, outer panels, side panels, inner hoods, outer hoods, or trunk lid panels. The aluminum alloy products and methods described herein can also be used in aircraft or railway vehicle applications, to prepare, for example, external and internal panels. Certain aspects and features of the present disclosure can provide metal articles with improved surface qualities and metallurgy, which can result in improved bonding capability and formability, which may be especially desirable for any of the applications mentioned herein, as well as others.

The aluminum alloy products and methods described herein can also be used in electronics applications. For example, the aluminum alloy products and methods described herein can be used to prepare housings for electronic devices, including mobile phones and tablet computers. In some examples, the aluminum alloy products can be used to prepare housings for the outer casing of mobile phones (e.g., smart phones), tablet bottom chassis, and other portable electronics.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative embodiments but, like the illustrative embodiments, should not be used to limit the present disclosure. The elements included in the illustrations herein may not be drawn to scale and certain dimensions may be exaggerated for illustrative purposes.

FIG. 1 is a representational schematic diagram depicting a processing line 100 for continuous heat treatment according to certain aspects of the present disclosure. The processing line 100 can be a heat treatment line for processing a metal strip 120 or other metal article. The metal strip can proceed in a downstream direction 146 through various zones or elements of the processing line 100. In some cases, the processing line 100 includes each of the zones depicted in FIG. 1, however that need not be the case. Any suitable combination of zones can be used. In some cases, a processing line 100 includes at least a heating zone 106, a soaking zone 108, and a quenching zone 110. In some cases, the processing line 100 also includes at least a reheating zone 114. While the arrangement of zones and/or elements can be adjusted as necessary, certain aspects of the present disclosure include the quenching zone 110 immediately following the soaking zone 108, which immediately follows the heating zone 106.

The metal strip 120 can be initially uncoiled from a starter coil by an uncoiler 102. The uncoiler can pass the metal strip 120 to a tension adjustment zone 104. Within the tension adjustment zone 104, an array of magnetic rotors can levitate the metal strip 120 and control tension in the metal strip. During a threading operation, the tension adjustment zone 104 may increase tension in the metal strip 120 (e.g., increase tension from left to right in the downstream direction 146), yet during standard heat treatment processing, the tension adjustment zone 104 may decrease (e.g., ramp down) tension in the metal strip 120.

In some cases, a welding or joining zone 170 can be collocated with the tension adjustment zone. The welding or joining zone 170 can include a moving welder or other joining device capable of welding or joining free ends of consecutive metal strips, allowing the processing line 100 to operate continuously through multiple coils of metal strip 120.

The metal strip 120 can pass into a heating zone 106, in which one or more arrays of magnetic rotors can heat and levitate the metal strip 120. The metal strip 120 can be heated to a desired temperature, such as a solutionizing temperature. The metal strip 120 exiting the heating zone 106 at the desired temperature can enter a soaking zone 108, in which the temperature of the metal strip 120 (e.g., peak metal temperature) is maintained at the desired temperature for a duration (e.g., the duration of the soaking zone 108). One or more arrays of magnetic rotors can levitate the metal strip 120 within the soaking zone 108, such as without the need for fluid-based levitation. In some cases, the soaking zone 108 can include a gas-filled chamber through which the metal strip 120 passes, which can be filled with an inert gas, a minimally reactive gas, or a treatment gas.

After exiting the soaking zone 108, the metal strip 120 can enter a quenching zone 110, in which the metal strip 120 can be rapidly quenched. The quenching zone 110 can include one or more coolant nozzles for dispensing coolant onto the metal strip. Additionally, an array of magnetic rotors can levitate the metal strip through the quenching zone 110. In some cases, a closed loop flatness control system can be used in the quenching zone 110, including a sensor for measuring flatness and one or more controls for adjusting distribution of the coolant fluid to achieve a desired flatness. In some cases, a closed loop flatness control system is downstream of the quenching zone 110.

The metal strip 120 can pass through a leveling and/or microtexturizing zone 112, which may be located downstream of a quenching zone 110. In the leveling and/or microtexturizing zone 112, the metal strip can pass between one or more sets of rollers designed to level and/or texturize the metal strip 120, such as without significantly or substantially reducing the overall thickness of the metal strip 120. An array of magnetic rotors can levitate the metal strip 120 in the leveling and/or microtexturizing zone 112 on the upstream and downstream side of the rollers, and can facilitate controlling tension of the metal strip 120 as it passes through the rollers.

The metal strip 120 can pass through a coating and/or lubrication zone 113, which may be located downstream of the quenching zone 110 and may be located downstream of a leveling and/or microtexturizing zone 112. Upon passing through the coating and/or lubrication zone 113, the metal strip 120 can be coated with any suitable coating and/or lubricated with any suitable lubricant, such as a liquid or solid coating and/or lubricant. An array of magnetic rotors can levitate the metal strip 120 through the coating and/or lubrication zone 113.

The metal strip 120 can pass through a reheating zone 114, which may be located downstream of the quenching zone 110, may be located downstream of a leveling and/or microtexturizing zone 112, and may be located downstream of a coating and/or lubrication zone 113. In the reheating zone 114, the metal strip 120 can be heated, such as to a temperature for coiling, storage, and/or aging. Any suitable heating device can be used, although in some cases, the reheating zone 114 includes an array of magnets that heat the metal strip 120. One or more arrays of magnetic rotors, which may include the array of magnetic rotors for heating the metal strip 120, can levitate the metal strip 120 through the reheating zone 114. In some cases where the metal strip passes through a coating and/or lubrication zone 113, the reheating zone 114 can sufficiently heat the metal strip 120 to cure the coating and/or lubricant and/or facilitate flow so it spreads uniformly without overheating.

The metal strip 120 can be coiled into a final coil by a coiler 118. The coiler 118 can receive the heat treated metal strip 120 directly from a quenching zone 110, a reheating zone 114, a final tension adjustment zone 116, or any other appropriate zone. Magnetic rotors in the immediately upstream zone, such as a final tension adjustment zone 116, can control tension in the metal strip 120. Generally, these magnetic rotors can increase tension in the metal strip to facilitate coiling by the coiler 118. In some cases, the magnetic rotors can decrease tension as well, if necessary.

Figure 2:
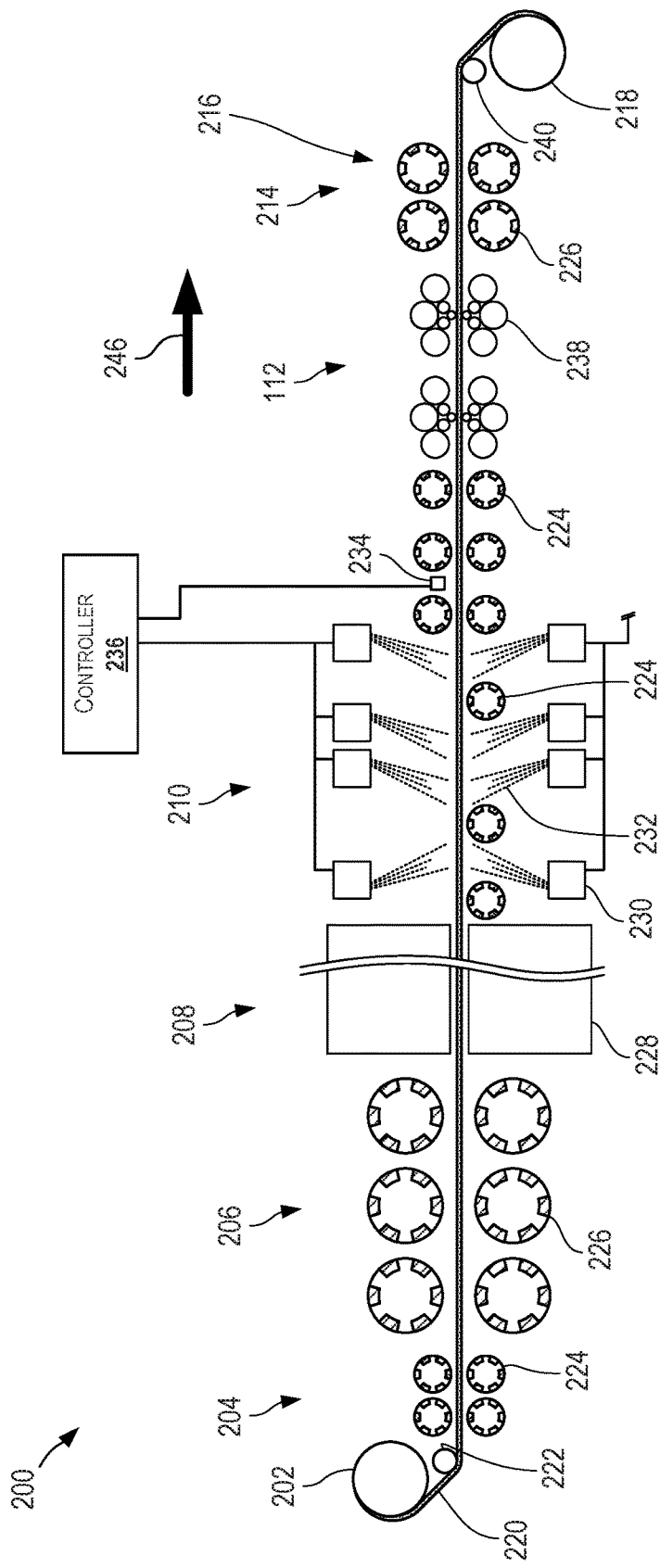
FIG. 2 is a schematic diagram depicting a side view of a processing line for continuous heat treatment according to certain aspects of the present disclosure.

FIG. 2 is a schematic diagram depicting a processing line 200 for continuous heat treatment according to certain aspects of the present disclosure. The processing line 200 is an example of a processing line similar to the processing line 100 of FIG. 1. An uncoiler 202 can uncoil metal strip 220 that can then be passed through a tension adjustment zone 204, a heating zone 206, a soaking zone 208, a quenching zone 210, a leveling and/or microtexturizing zone 212, and a final tension adjustment zone 116, before being coiled by a coiler 218.

Proximate the uncoiler 202, an uncoiling roller 222 can direct the metal strip 220 towards a desired passline through the processing line 200. The uncoiling roller 222 can also include load cells for measuring tension in the metal strip 220. The uncoiling roller 222 can provide tension measurements to a controller 236, which can use the measurements to control the magnetic rotors 224 of the tension adjustment zone 204 to achieve a desirable tension in the metal strip 220 suitable for uncoiling. The tension adjustment zone 204 can also act to reduce tension in the metal strip 220 such that sufficient tension is maintained upstream of the tension adjustment zone 204 for uncoiling and low tension is maintained downstream of the tension adjustment zone 204 for improved heat treatment.

In the heating zone 206, the metal strip 220 can pass through gaps between multiple pairs of magnetic rotors 226. As depicted in FIG. 2, the magnetic rotors 226 for heating can have a larger diameter than the magnetic rotors 224 used for levitation or tension control. Magnetic rotors 226 for heating can have other differences from magnetic rotors 224 for levitation or tension control, such as magnetic strength, position, rotation speed, flux concentrators, or other differences such as those disclosed herein. As the metal strip 220 passes through the heating zone 206, the metal strip 220 can be heated and levitated by each of the magnetic rotors 226. Upon exiting the heating zone 206, the metal strip 220 can be at a desired temperature, such as a solutionizing temperature. Sensors in the heating zone 206 can provide temperature and/or other measurements to the controller 236, which can use the measurements to adjust the magnetic rotors 226 in the heating zone 206 to achieve the desired temperature.

The metal strip 220 can exit the heating zone 206 into a soaking zone 208, in which the metal strip 220 can pass through a soaking furnace 228. The soaking furnace 228 can be a gas fired furnace, hot air furnace, or other furnace suitable for maintaining temperature of the metal strip 220. In some cases, the soaking furnace 228 includes one or more magnetic rotors 224 for levitating the metal strip and optionally providing some heat to facilitate maintaining the desired temperature. The soaking furnace 228 can be of sufficient length for the metal strip 220 to maintain the desired temperature for a desired duration at the speed which the metal strip 220 moves through the soaking furnace 228 in the downstream direction 246. Sensors in the soaking zone 208 can provide temperature and/or other measurements to the controller 236, which can use the measurements to adjust the soaking furnace 228 to ensure the metal strip 220 is maintained at the desired temperature.

Upon exiting the soaking zone 208, the metal strip 220 can enter the quenching zone 210. In the quenching zone 210, the metal strip 220 can be optionally levitated by an array of magnetic rotors 224. In the quenching zone 210, one or more coolant nozzles 230 can dispense coolant fluid 232 onto the metal strip 220 to rapidly quench the metal strip 220. Sensors in the quenching zone 210 can provide temperature and/or other measurements to the controller 236, which can then adjust the coolant nozzles 230 to ensure a desired quenching rate is maintained. In some cases, a flatness sensor 234 can be positioned at or downstream of the quenching zone 210. Measurements from the flatness sensor can be provided to the controller 236, which can use the measurements to adjust the coolant nozzles 230 to achieve a desired profile of coolant fluid 232 dispensing across the lateral width of the metal strip 220 that may improve the flatness of the metal strip 220.

The metal strip 220 can pass through a leveling and/or microtexturizing zone 112. In the leveling and/or microtexturizing zone 112, the metal strip 220 can pass between one or more sets of leveling and/or microtexturizing rollers 238. The leveling and/or microtexturizing rollers 238 can impart a desirable texture on the surface of the metal strip 220 and/or facilitate leveling the metal strip 220. In some cases, sensors in the leveling and/or microtexturizing zone 112 can provide feedback to the controller 236, which can use the measurements to control the leveling and/or microtexturizing rollers 238 to facilitate improving leveling of the metal strip 220.

The metal strip 220 can pass through a reheating zone 214 in which the metal strip 220 can be heated by a set of magnetic rotors 226. The magnetic rotors 226 in the reheating zone 214 can be smaller or otherwise different from the magnetic rotors 226 of the heating zone 206. In some cases, the magnetic rotors 226 in the reheating zone 214 can be identical to the magnetic rotors 224 used for levitation in other zones. Sensors in the reheating zone 214 can provide temperature and/or other measurements to the controller 236, which can use the measurements to adjust the magnetic rotors 226 in the reheating zone 214 to achieve a desired reheating temperature.

As depicted in the processing line 200 of FIG. 2, the reheating zone 214 also acts as a final tension adjustment zone 216. Control of the magnetic rotors 226 of the reheating zone 214 can reheat the metal strip 220 and control the tension in the metal strip, such as to achieve a tension suitable for recoiling by the coiler 218. The metal strip 220 can pass over a coiling roller 240 prior to being coiled by the coiler 218. The coiling roller 240 can provide tension measurements to a controller 236, which can adjust the magnetic rotors 224 of the final tension adjustment zone 216 (e.g., the reheating zone 214) to achieve a tension in the metal strip 220 suitable for coiling. The final tension adjustment zone 216 can also act to increase tension in the metal strip 220 such that low tension is maintained upstream of the final tension adjustment zone 216 for improved heat treatment and sufficient tension is maintained downstream of the final tension adjustment zone 216 for coiling.

Figure 3:
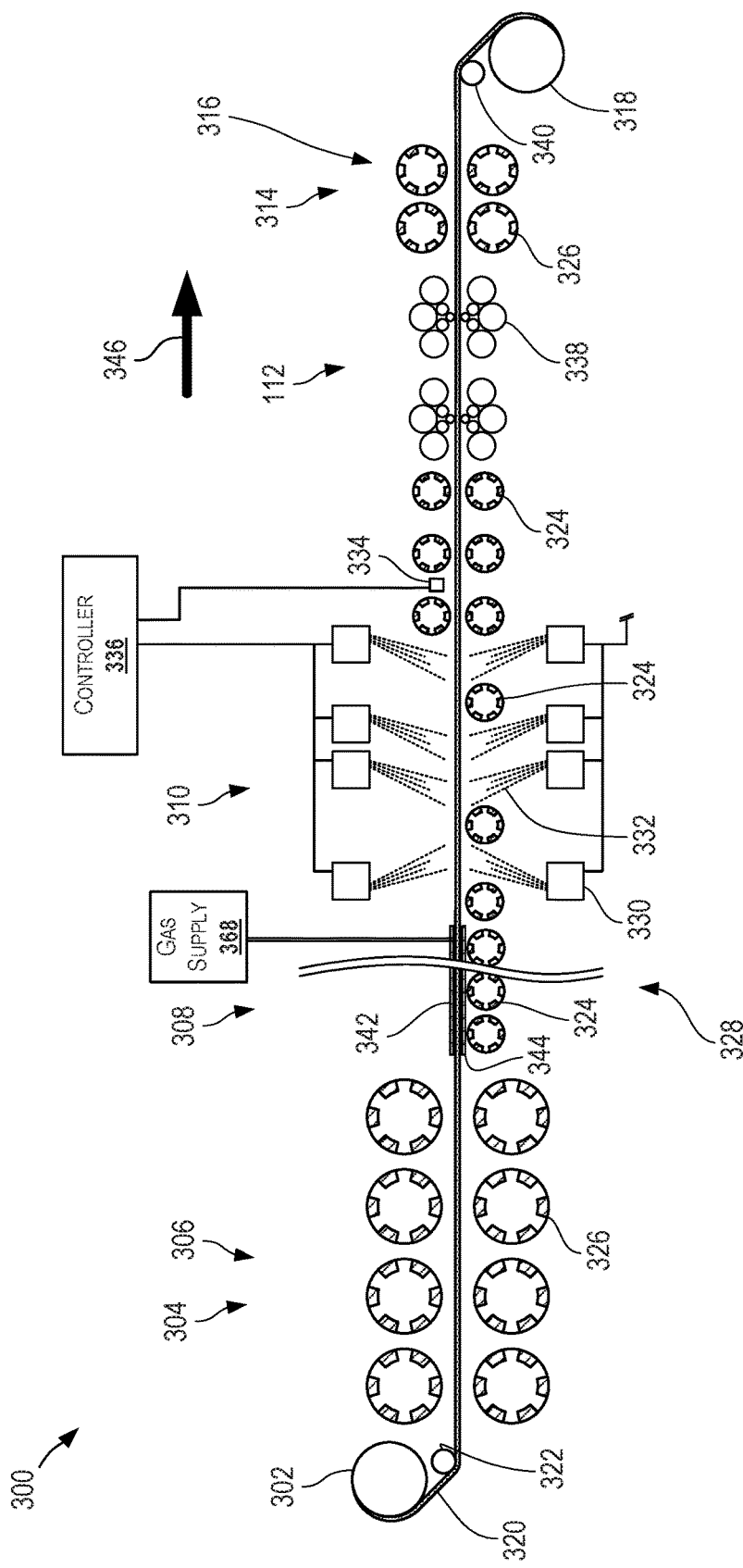
FIG. 3 is a schematic diagram depicting a side view of a processing line for continuous heat treatment having a magnetic soaking furnace according to certain aspects of the present disclosure.

FIG. 3 is a schematic diagram depicting a processing line 300 for continuous heat treatment having a magnetic soaking furnace 328 according to certain aspects of the present disclosure. The processing line 300 is an example of a processing line similar to the processing line 100 of FIG. 1. An uncoiler 302 can uncoil metal strip 320 that can then be passed through a combined tension adjustment zone 304 and heating zone 306, a soaking zone 308, a quenching zone 310, a leveling and/or microtexturizing zone 312, and a final tension adjustment zone 116, before being coiled by a coiler 318.

Proximate the uncoiler 302, an uncoiling roller 322 can direct the metal strip 320 towards a desired passline through the processing line 300. The uncoiling roller 322 can also include load cells for measuring tension in the metal strip 320. The uncoiling roller 322 can provide tension measurements to a controller 336, which can use the measurements to control the magnetic rollers 326 of the tension adjustment zone 304 (e.g., the heating zone 306) to achieve a desirable tension in the metal strip 320 suitable for uncoiling. The tension adjustment zone 304 can also act to reduce tension in the metal strip 320 such that sufficient tension is maintained upstream of the tension adjustment zone 304 for uncoiling and low tension is maintained downstream of the tension adjustment zone 304 for improved heat treatment.

In the heating zone 306, the metal strip 320 can pass through gaps between multiple pairs of magnetic rotors 326. As depicted in FIG. 3, the magnetic rotors 326 for heating can have a larger diameter than the magnetic rotors 324 used for levitation or tension control. Magnetic rotors 326 for heating can have other differences from magnetic rotors 324 for levitation or tension control, such as magnetic strength, position, rotation speed, flux concentrators, or other differences such as those disclosed herein. As the metal strip 320 passes through the heating zone 306, the metal strip 320 can be heated and levitated by each of the magnetic rotors 326. Upon exiting the heating zone 306, the metal strip 320 can be at a desired temperature, such as a solutionizing temperature. Sensors in the heating zone 306 can provide temperature and/or other measurements to the controller 336, which can use the measurements to adjust the magnetic rotors 326 in the heating zone 306 to achieve the desired temperature.

The metal strip 320 can exit the heating zone 306 into a soaking zone 308, in which the metal strip 320 can pass through a soaking furnace 328. The soaking furnace 328 can be a magnetic-rotor-based furnace for maintaining temperature of the metal strip 320. An array of magnetic rotors 324 can be positioned adjacent the metal strip 320 to levitate the metal strip 320 through the soaking zone 308. In some cases, the magnetic rotors 324 can also generate an amount of heat to help facilitate maintaining the desired temperature in the metal strip. In some cases, the soaking furnace 328 includes a chamber defined, at least in part, by an upper wall 342 and a lower wall 344. Side walls may be included and are not visible in FIG. 3. The chamber can be supplied with a gas from a gas supply 368. The metal strip 320 can be supported in the gas-filled chamber throughout the soaking zone 308. The soaking furnace 328 can be of sufficient length for the metal strip 320 to maintain the desired temperature for a desired duration at the speed which the metal strip 320 moves through the soaking furnace 328 in the downstream direction 346. Sensors in the soaking zone 308 can provide temperature and/or other measurements to the controller 336, which can use the measurements to adjust the soaking furnace 328 to ensure the metal strip 320 is maintained at the desired temperature. Such adjustments can include adjusting a temperature of the gas supply 368, adjusting one or more of the magnetic rotors 324 in the soaking zone 308, adjusting one or more coolant nozzles within the gas-filled chamber, or performing other actions.

Upon exiting the soaking zone 308, the metal strip 320 can enter the quenching zone 310. In the quenching zone 310, the metal strip 320 can be optionally levitated by an array of magnetic rotors 324. In the quenching zone 310, one or more coolant nozzles 330 can dispense coolant fluid 332 onto the metal strip 320 to rapidly quench the metal strip 320. Sensors in the quenching zone 310 can provide temperature and/or other measurements to the controller 336, which can then adjust the coolant nozzles 330 to ensure a desired quenching rate is maintained. In some cases, a flatness sensor 334 can be positioned at or downstream of the quenching zone 310. Measurements from the flatness sensor can be provided to the controller 336, which can use the measurements to adjust the coolant nozzles 330 to achieve a desired profile of coolant fluid 332 dispensing across the lateral width of the metal strip 320 that may improve the flatness of the metal strip 320.

The metal strip 320 can pass through a leveling and/or microtexturizing zone 112. In the leveling and/or microtexturizing zone 112, the metal strip 320 can pass between one or more set of leveling and/or microtexturizing rollers 338. The leveling and/or microtexturizing rollers 338 can impart a desirable texture on the surface of the metal strip 320 and/or facilitate leveling the metal strip 320. In some cases, sensors in the leveling and/or microtexturizing zone 112 can provide feedback to the controller 336, which can use the measurements to control the leveling and/or microtexturizing rollers 338 to facilitate improving leveling of the metal strip 320.

The metal strip 320 can pass through a reheating zone 314 in which the metal strip 320 can be heated by a set of magnetic rotors 326. The magnetic rotors 326 in the reheating zone 314 can be smaller or otherwise different from the magnetic rotors 326 of the heating zone 306. In some cases, the magnetic rotors 326 in the reheating zone 314 can be identical to the magnetic rotors 324 used for levitation in other zones. Sensors in the reheating zone 314 can provide temperature and/or other measurements to the controller 336, which can use the measurements to adjust the magnetic rotors 326 in the reheating zone 314 to achieve a desired reheating temperature.

As depicted in the processing line 300 of FIG. 3, the reheating zone 314 also acts as a final tension adjustment zone 316. Control of the magnetic rotors 326 of the reheating zone 314 can reheat the metal strip 320 and control the tension in the metal strip, such as to achieve a tension suitable for recoiling by the coiler 318. The metal strip 320 can pass over a coiling roller 340 prior to being coiled by the coiler 318. The coiling roller 340 can provide tension measurements to a controller 336, which can adjust the magnetic rotors 324 of the final tension adjustment zone 316 (e.g., the reheating zone 314) to achieve a tension in the metal strip 320 suitable for coiling. The final tension adjustment zone 316 can also act to increase tension in the metal strip 320 such that low tension is maintained upstream of the final tension adjustment zone 316 for improved heat treatment and sufficient tension is maintained downstream of the final tension adjustment zone 316 for coiling.

Figure 4:
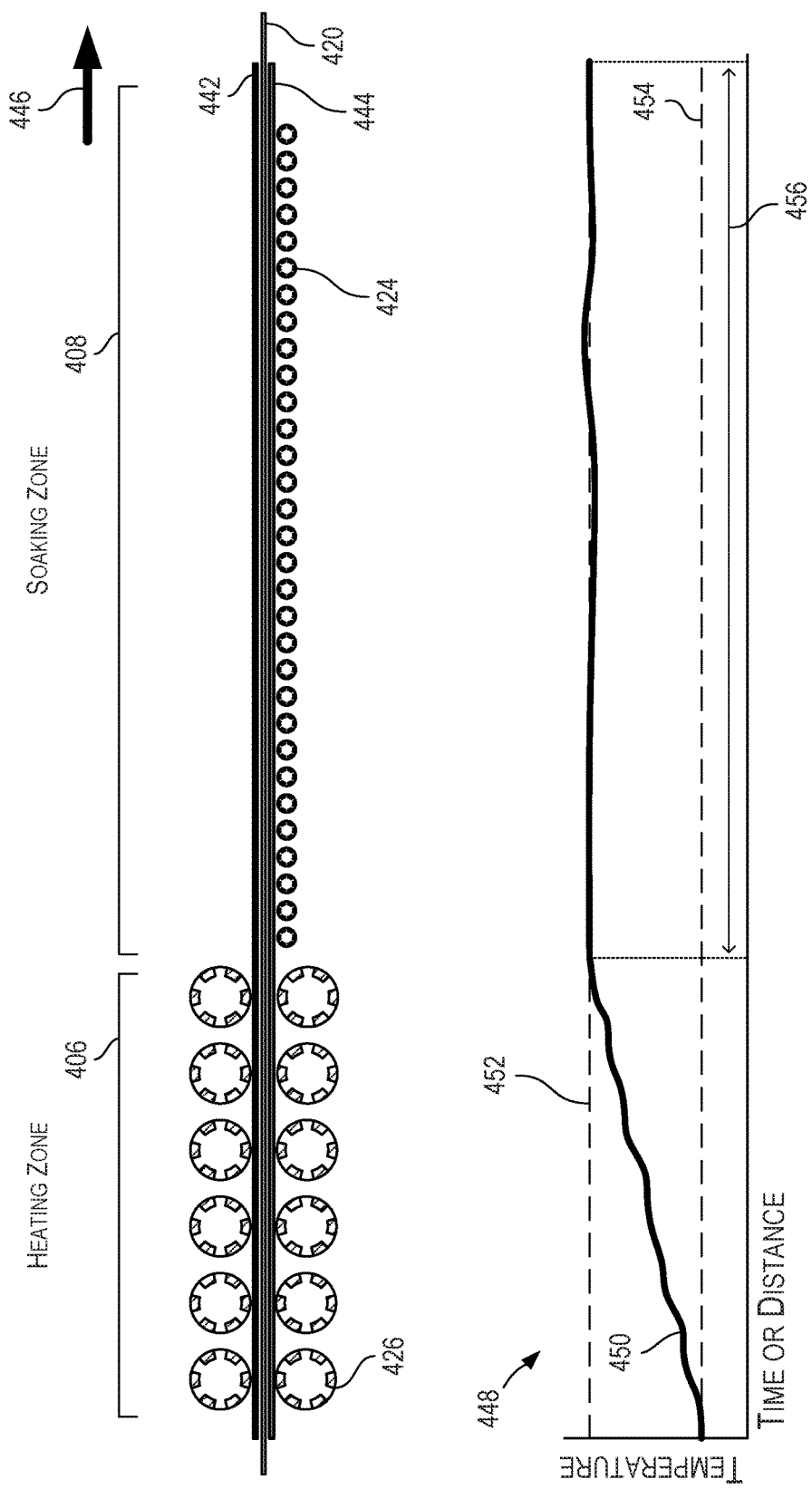
FIG. 4 is a combination schematic diagram and temperature chart depicting a heating zone and soaking zone of a processing line according to certain aspects of the present disclosure.

FIG. 4 is a combination schematic diagram and temperature chart 448 depicting a heating zone 406 and soaking zone 408 of a processing line according to certain aspects of the present disclosure. The temperature chart 448 is aligned with the heating zone 406 and soaking zone 408 to display an approximate temperature 450 (e.g., peak metal temperature) of the metal strip 420 at different times and/or distances along the processing line. The heating zone 406 and soaking zone 408 of FIG. 4 can be the heating zone 106 and soaking zone 108 of FIG. 1. A metal strip 420 can travel through the heating zone 406 and soaking zone 408 in a downstream direction 446.

In the heating zone 406, an array of magnetic rotors 426 can heat the metal strip 420 to raise a temperature of the metal strip 420. The array of magnetic rotors 426 includes six pairs of magnetic rotors 436 longitudinally spaced apart from one another, with each pair of magnetic rotors 436 including opposing top and bottom magnetic rotors on opposite sides of the metal strip 420. In some cases, the array of magnetic rotors 426 can include other numbers of magnetic rotors in other configurations and/or orientations. The temperature chart 448 shows that the temperature 450 of the metal strip 420 increases as the metal strip 420 passes each of the pairs of magnetic rotors 436. The temperature 450 of the metal strip 420 increases from an entrance temperature 454 to a desired setpoint temperature 452 (e.g., a solutionizing temperature) within the heating zone 406.

In the soaking zone 408, an array of magnetic rotors 424 levitates the metal strip 420, allowing the metal strip 420 to soak at the desired setpoint temperature 452 for a desired duration. Optional coolant dispensers can be used to help maintain the temperature 450 at the desired setpoint temperature 452, to offset any heating effects from the array of magnetic rotors 424. The array of magnetic rotors 424 can include several magnetic rotors 424, such as 31 magnetic rotors 424. Each magnetic rotor 424 can include one or more laterally spaced apart magnetic sources occupying less than the full width of the metal strip 420 (e.g., at or less than approximately 95%, 90%, 85%, 80%, 75%, 70%, 65%, 60%, 55%, 50%, 45%, 40%, 35%, 30%, 25%, 20%, 15%, or 10% of the lateral width of the metal strip 420).

A chamber for containing an inert atmosphere can be defined in part by an upper wall 442 and a lower wall 444, as well as side walls (not shown). Each of the upper wall 442 and lower wall 444, as well as optionally the side walls, can be made of a non-conductive and thermally insulating material. The metal strip 420 can pass between the upper wall 442 and the lower wall 444 as it travels through the heating apparatus 400. The magnetic rotors 426 in the heating zone 406 and the magnetic rotors 424 in the soaking zone 408 can be positioned outside of the chamber, opposite the upper wall 442 and/or lower wall 444 from the metal strip 420. As depicted in FIG. 4, the chamber walls 442, 444 extend longitudinally throughout the heating zone 406 and the soaking zone 408. In some other cases, such as depicted in FIG. 3, the chamber walls may not extend into the heating zone. The soaking zone 408 can be of sufficient length to achieve a desired soaking duration 456. The soaking duration 456 can be the duration of time during which the peak metal temperature of the metal strip 420 is at or approximately at the desired setpoint temperature 452.

Figure 5:
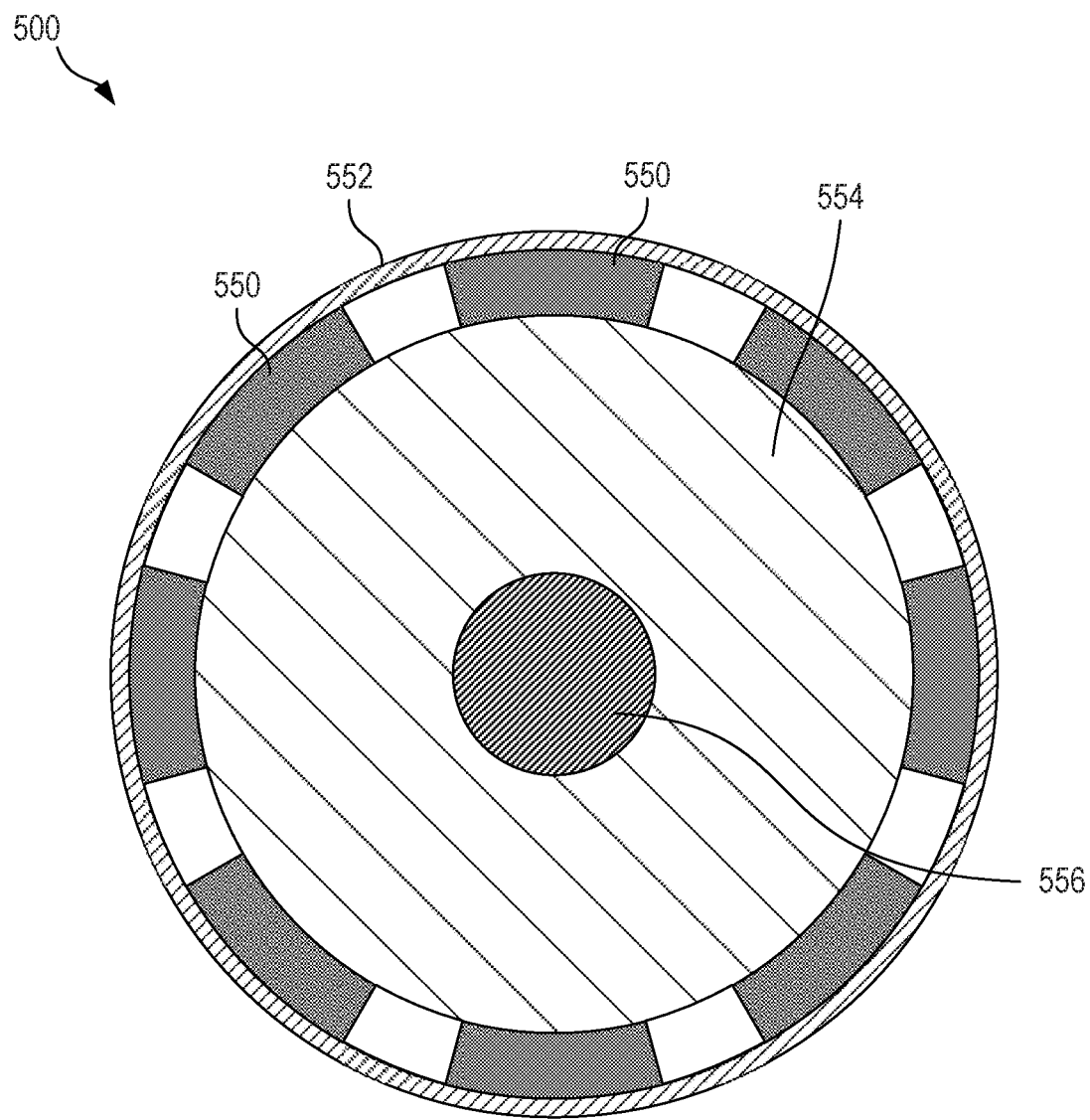
FIG. 5 is a cutaway side view of a permanent magnetic rotor according to certain aspects of the present disclosure.

FIG. 5 is a cutaway side view of a permanent magnetic rotor 500 according to certain aspects of the present disclosure. The permanent magnetic rotor 500 is an example of a magnetic rotor, such as magnetic rotors 224, 226 of FIG. 2. The magnetic rotor 500 can include one or more magnetic sources 550. As seen in FIG. 5, the magnetic rotor 500 includes eight magnetic sources 550 that are permanent magnets. The magnets can be arranged in any suitable orientation. Magnetic sources 550 can be arranged such that adjacent permanent magnets provide different poles facing radially outwards (e.g., alternating N, S, N, S, N, S, N, S). Any suitable permanent magnet can be used, such as samarium cobalt, neodymium, or other magnets. In some cases, samarium cobalt magnets may be desirable over neodymium magnets, as samarium cobalt magnets may drop in magnetic field strength slower with higher heats. However, in some cases, neodymium magnets may be desirable over samarium cobalt magnets, as neodymium magnets have stronger field strengths at cooler temperatures.

The magnetic sources 550 can be enclosed by a shell 552. The shell 552 can be any suitable material capable of allowing magnetic flux to pass therethrough. In some cases, the shell 552 can be made of or can further include a non-metallic coating. In some cases, the shell 552 can include a Kevlar® or Kevlar® blend coating. In some cases, the shell 552 can include portions designed to redirect flux such that the permanent magnetic rotor 500 has an uneven magnetic flux profile along the length of the magnetic rotor.

In some cases, the magnetic rotor 500 can include a ferromagnetic core 554 having a central axle 556. The magnetic rotor 500 can include other internal arrangements suitable for supporting the magnetic sources 550. Any suitable number of magnetic sources 550 can be used, however it has been found that efficient results can be achieved with an even number of magnetic sources 550, such as six or eight magnetic sources 550.

The magnetic sources 550 can be sized to cover any percentage of the circumference of the magnetic rotor 500. Efficient results can be achieved with magnetic sources 550 sized to occupy approximately 40%-95%, 50%-90%, or 70%-80% of the circumference of the magnetic rotor 500.

The magnetic rotor 500 can be formed in any suitable size, however it has been found that efficient results can be achieved with a rotor having a diameter between 200 mm and 600 mm, at least 300 mm, at least 400 mm, at least 500 mm, or about 600 mm.

The thickness of each magnetic source 550 can be any suitable thickness capable of fitting within the magnetic rotor 500, however it has been found that efficient results can be achieved with permanent magnet thicknesses of at or at least 15 mm, 15-100 mm 15-40 mm, 20-40 mm, 25-35 mm, 30 mm, or 50 mm. Other thicknesses can be used.

Through trial and experimentation, it has been determined that highly efficient heating power can be obtained with the use of six or eight magnets positioned around a single rotor, although other numbers of magnets can be used. When too many magnets are used, the heating power can drop off. In some cases, the number of magnets can be selected to minimize installation and/or maintenance cost (e.g., the number of magnets to purchase). In some cases, the number of magnets can be selected to minimize the tension fluctuations that occur in the metal strip due to the movement of the magnets adjacent the metal strip. For example, very few magnets may cause larger and/or longer tension fluctuations, whereas more magnets may cause smaller and/or shorter fluctuations. Through trial and experimentation, it has been determined that highly efficient heating power and/or levitation can be obtained when the magnets occupy 40% to 95% of the circumference of the rotor, or more specifically 50%-90% or 70%-80% of the circumference of the rotor. Through trial and experimentation, it has been determined that highly efficient heating power can be obtained when the diameter of the rotor is large, such as at or greater than 200, 300, 400, 500, or 600 mm. Additionally, the use of larger rotors can help minimize magnet costs. In some cases, smaller rotors (e.g., at or below 600, 500, 400, 300, or 200 mm in diameter) can be especially suitable for levitating the metal article, whereas the larger rotors can be especially suitable for heating the metal article.

As the speed of the rotor increases, the heating power tends to increase. However, in some cases, if the speed of the rotor reaches a threshold level, further increases in speed will negatively impact the heating efficiency due to the inherent inductance and resistivity characteristics of the metal strip. It has been determined that at or approximately 1800 revolutions per minute (e.g., within 1%, 2%, 3%, 4%, 5%, 6%, 7%, 8%, 9%, 10%, 15%, or 20% of 1800 revolutions per minute) can be a desirable speed in part due to the simplicity in controlling rotor motors at the 60 Hz frequency found in mains power in various locales. In some cases, other frequencies can be selected based on the rotor motor used and/or the mains power supplied. It has been determined that while rotor speed can be a useful method for controlling the amount of heat energy applied to the metal strip, it can be advantageous to maintain a constant rotor speed and use vertical gap control and other controls to adjust the amount of heat energy applied to the metal strip.

Through trial and experimentation, it has been determined that highly efficient heating power can be obtained when the thicknesses of the permanent magnets in the rotor are between 15-40 mm, 20-40 mm, or 25-35 mm, or at or approximately at 30 mm. While strong heating power can be obtained with thicker magnets, the use of magnets within the above ranges can provide sufficiently strong heating power while simultaneously keeping the installation/maintenance costs of the magnets down.

Figure 6:
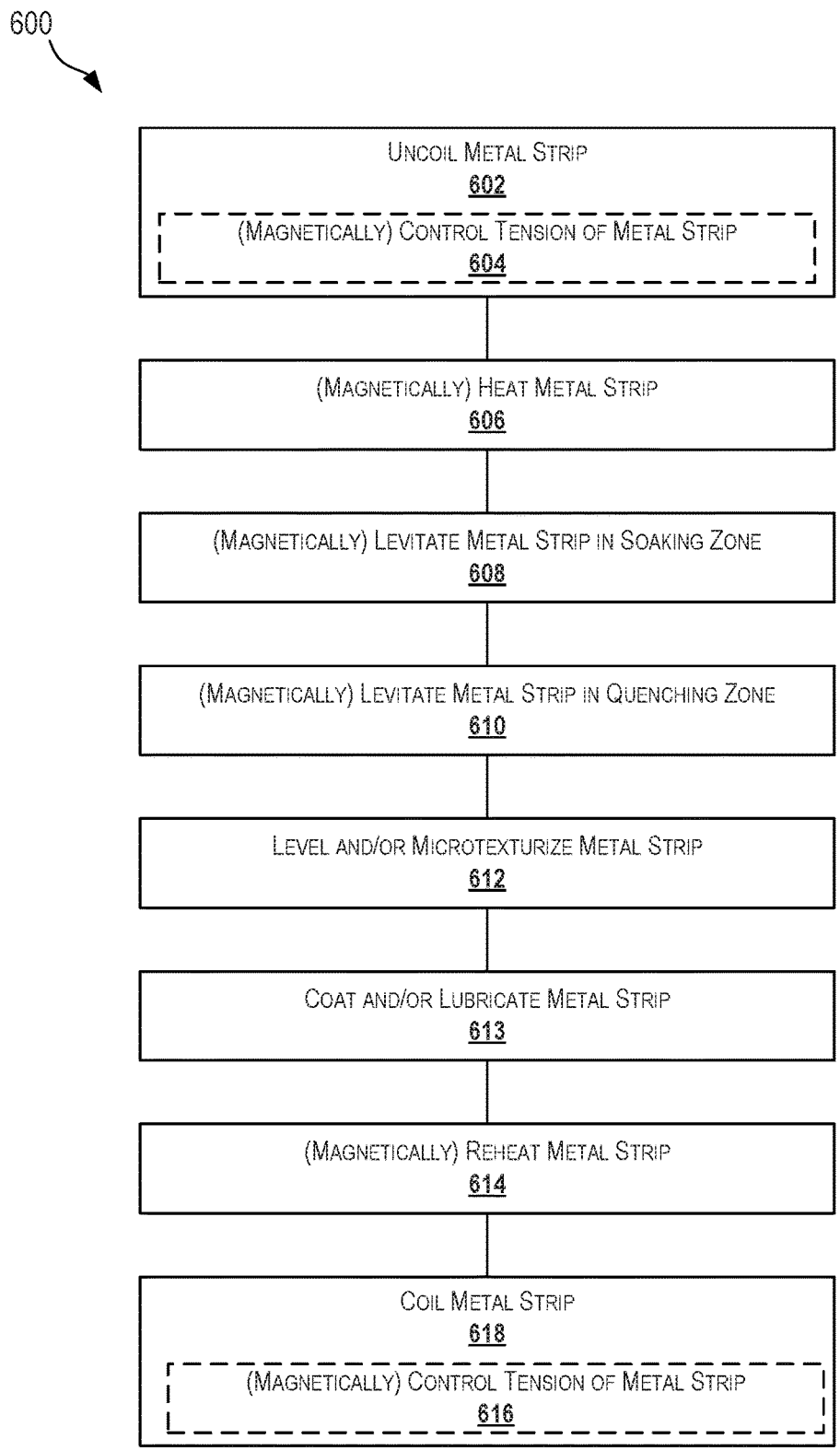
FIG. 6 is a flowchart depicting a process for continuously heat treating a metal strip according to certain aspects of the present disclosure.

FIG. 6 is a flowchart depicting a process 600 for continuously heat treating a metal strip according to certain aspects of the present disclosure. The process 600 can be carried out using the processing line 100 of FIG. 1, or a similar processing line. In some cases process 600 can include more or fewer elements than those depicted in FIG. 6, as well as elements in different orders. In some cases, process 600 can include at least blocks 606, 608, and 610. In some cases, process 600 can additionally include at least block 614.

At block 602, a metal strip can uncoiled. In some cases, uncoiling the metal strip can include controlling tension of the magnetic strip at block 604, such as through the use of magnetic rotors. At block 606, the metal strip can be heated, such as through the use of magnetic rotors. In some cases, heating the metal strip at block 606 can also include levitating the metal strip using magnetic rotors.

At block 608, the metal strip can be levitated in a soaking zone. In some cases, the metal strip can be levitated in a soaking zone using an array of magnetic rotors. While being levitated in the soaking zone, a temperature (e.g., peak metal temperature) of the metal strip can be maintained at or near a desired temperature (e.g., a solutionizing temperature). In some cases, the metal strip can be levitated in the soaking zone within a gas-filled chamber. The gas-filled chamber can be filled with an inert gas, a minimally reactive gas, or a treatment gas.

At block 610, the metal strip can be directed into a quenching zone where the metal strip is rapidly quenched, such as at a speed at or near approximately 200° C./s. The metal strip can be levitated, such as using an array of magnetic rotors. In some cases, quenching the metal strip at block 610 can include controlling flatness through closed-loop feedback.

At block 612, the metal strip can be leveled and/or microtexturized by passing the metal strip through leveling and/or microtexturizing rollers. In some cases, the metal strip can be levitated by an array of magnetic rotors at positions adjacent the leveling and/or microtexturizing rollers. In some cases, levitating the metal strip at these locations can include controlling tension of the metal strip as it passes through the leveling and/or microtexturizing rolelrs.

At block 613, the metal strip can be coated and/or lubricated. Coating and/or lubricating the metal strip can include levitating the metal strip using an array of magnetic rotors. Coating and/or lubricating the metal strip can include coating the metal strip with a fluid or solid material including lubricants.

At block 614, the metal strip can be reheated. Reheating the metal strip can include passing the metal strip adjacent an array of magnetic rotors. In some cases, the metal strip can be levitated by an array of magnetic rotors during reheating. In some cases, reheating the metal strip at block 614 can include curing a coating on the metal strip or facilitaing flow of a lubricant on the metal strip.

At block 618, the metal strip can be coiled. The metal strip can be coiled into a final coil as a heat treated metal strip. In some cases, coiling the metal strip can include controlling tension of the magnetic strip at block 616, such as through the use of magnetic rotors.

Figure 7:
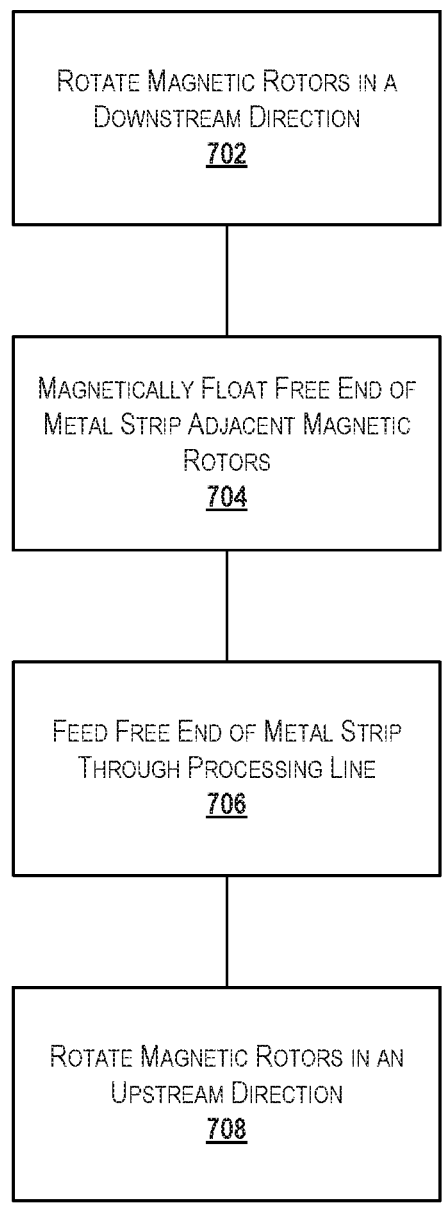
FIG. 7 is a flowchart depicting a process for threading a metal strip into a continuous heat treating line according to certain aspects of the present disclosure.

FIG. 7 is a flowchart depicting a process 700 for threading a metal strip into a continuous heat treating line according to certain aspects of the present disclosure. The process 700 can be used with the processing line 100 of FIG. 1 or a similar processing line. The process 700 can be enabled due to the use of magnetic rotors for levitating the metal strip at various positions along the processing line.

At block 702, one or more magnetic rotors can be rotated in a downstream direction. Any or all magnetic rotors of the processing line can be rotated in a downstream direction. In some cases, rotating a magnetic rotor in a downstream direction can include rotating one or more upper magnetic rotors (e.g., rotors located above the metal strip) at a speed faster than one or more lower magnetic rotors (e.g., rotors located below the metal strip).

At block 704, a free end of the metal strip can be floated adjacent the magnetic rotors. Rotation of the magnetic rotors at block 702 can facilitate floating of the free end of the metal strip at block 704. In some cases, floating the free end of the metal strip can further include attaching the free end of the metal strip to a carriage or other support. At block 706, the free end of the metal strip can be fed through the processing line. Feeding the free end of the metal strip through the processing line can include feeding the free end of the metal strip through one or more elements of the processing line. In some cases, feeding the free end of the metal strip through the processing line can include urging the free end of the metal strip through the processing line using a carriage.

At block 708, one or more of the magnetic rotors can be rotated in an upstream direction. The one or more magnetic rotors can include one or more magnetic rotors adjacent an uncoiler. Rotating the magnetic rotors in an upstream direction can occur after the metal strip has been fully threaded through the processing line.

Figure 8:
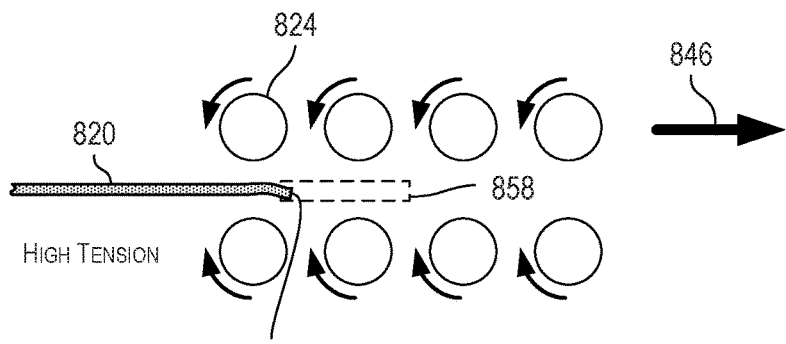
FIG. 8 is a schematic side view diagram depicting an initial phase of threading a metal strip into a continuous heat treating line according to certain aspects of the present disclosure.

FIG. 8 is a schematic diagram depicting an initial phase of threading a metal strip 820 into a continuous heat treating line according to certain aspects of the present disclosure. In an initial phase of threading, magnetic rotors 824 can be rotated in a downstream direction 846. Rotation of the magnetic rotors 824 in a downstream direction 846 can facilitate maintaining a relatively high tension in the metal strip 820 upstream of the free end 859 of the metal strip. In some cases, an optional carriage 858 can be removably coupled to the metal strip 820 to facilitate feeding the metal strip 820 through the processing line. The optional carriage 858 can be supported to move along the processing line, such as along one or more rails.

Figure 9:
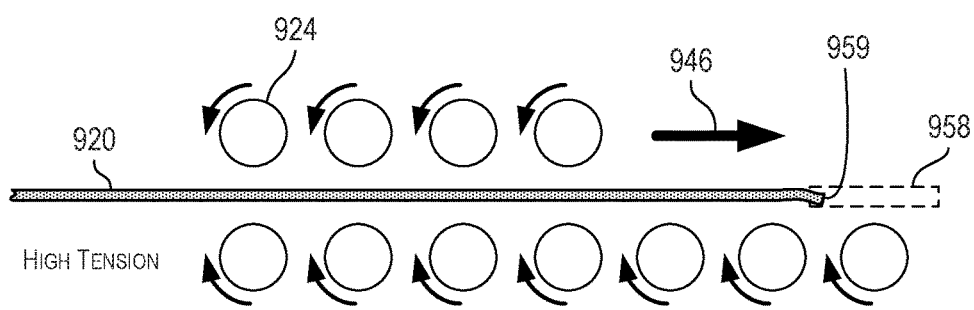
FIG. 9 is a schematic side view diagram depicting a secondary phase of threading a metal strip into a continuous heat treating line according to certain aspects of the present disclosure.

FIG. 9 is a schematic diagram depicting a secondary phase of threading a metal strip 920 into a continuous heat treating line according to certain aspects of the present disclosure. In a secondary phase of threading, magnetic rotors 924 can continue to rotate in a downstream direction 946. Rotation of the magnetic rotors 924 in a downstream direction 946 can continue to facilitate maintaining a relatively high tension in the metal strip 920 upstream of the free end 959 of the metal strip. In some cases, an optional carriage 958 removably coupled to the metal strip 920 can facilitate feeding the metal strip 920 through the processing line. The optional carriage 958 can be supported to move along the processing line, such as along one or more rails. To feed the metal strip 920, the optional carriage 958 can be directed in a downstream direction 946.

Figure 10:
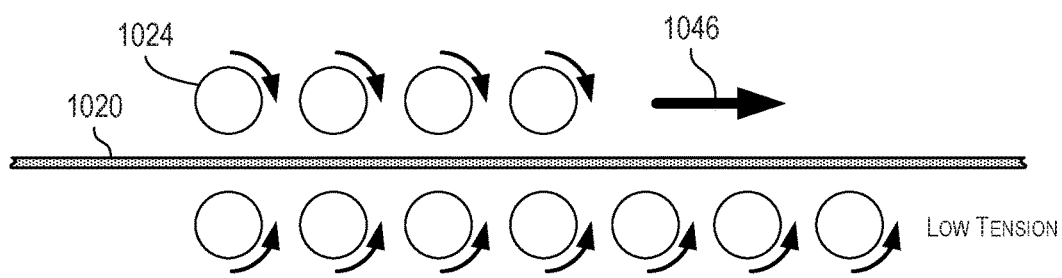
FIG. 10 is a schematic side view diagram depicting a metal strip after being threaded into a continuous heat treating line according to certain aspects of the present disclosure.

FIG. 10 is a schematic diagram depicting a metal strip 1020 after being threaded into a continuous heat treating line according to certain aspects of the present disclosure. After fully threading the metal strip 1020 or at least substantially threading the metal strip 1020 (e.g., at least 50% threaded through the processing line), one or more magnetic rotors 1024 can be reversed to rotate in an upstream direction opposite the downstream direction 1046. Rotation of the magnetic rotors in an upstream direction can facilitate maintaining a low tension in the metal strip downstream of the magnetic rotors rotating in the upstream direction. In some cases, the magnetic rotors that rotate in an upstream direction can be upstream of a heating zone such that the metal strip 1020 is maintained in relatively low tension while within the heating zone.

Figure 11:
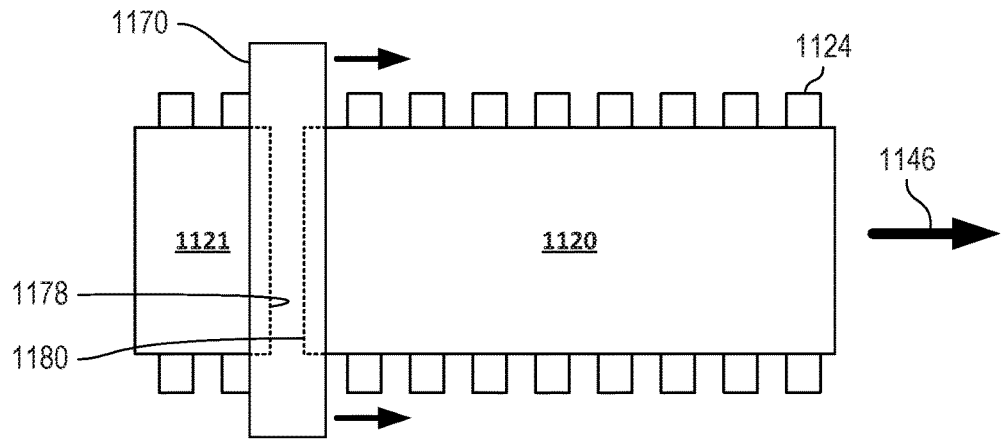
FIG. 11 is a schematic top view diagram depicting a metal strip and a subsequent metal strip during a pre-weld phase according to certain aspects of the present disclosure.

FIG. 11 is a schematic top view diagram depicting a metal strip 1120 and a subsequent metal strip 1121 during a pre-weld phase according to certain aspects of the present disclosure. In the top view, the metal strip 1120 and subsequent metal strip 1121 are shown being levitated above an array of magnetic rotors 1124. The magnetic rotors 1124 depicted in FIG. 11 can be magnetic rotors 1124 of a tension adjustment zone or a welding/joining zone, which can be located downstream of a uncoiler and upstream of a heating zone.

A longitudinally movable joiner, such as a welder 1170, can be suspended above the metal strip 1120 and subsequent metal strip 1121, although in other cases it can be suspended below. The movable welder 1170 can move in a downstream direction 1146. The metal strip 1120 and subsequent metal strip 1121 can also move in a downstream direction 1146. In some cases, the metal strip 1120 and subsequent metal strip 1121 can move in a downstream direction 1146 at a a speed below a normal operating speed for heat treating the metal strip. In the pre-weld phase, a leading end 1178 (e.g., downstream end) of the subsequent metal strip 1121 can be moved towards a trailing end 1180 (e.g., upstream end) of the metal strip 1120.

Figure 12:
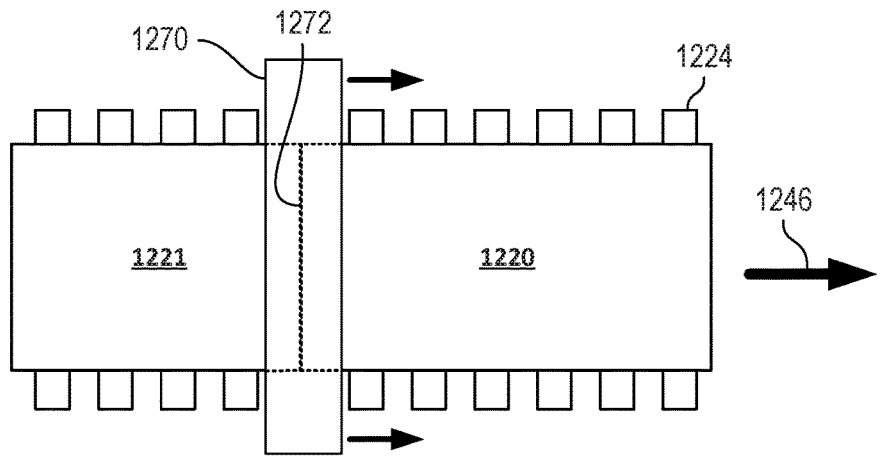
FIG. 12 is a schematic top view diagram depicting a metal strip and a subsequent metal strip during a welding phase according to certain aspects of the present disclosure.

FIG. 12 is a schematic top view diagram depicting a metal strip 1220 and a subsequent metal strip 1221 during a welding or joining phase according to certain aspects of the present disclosure. In the top view, the metal strip 1220 and subsequent metal strip 1221 are shown being levitated above an array of magnetic rotors 1224. The magnetic rotors 1224 depicted in FIG. 12 can be magnetic rotors 1224 of a tension adjustment zone or a welding/joining zone, which can be located downstream of a uncoiler and upstream of a heating zone.

In the welding or joining phase, the leading end of the subsequent metal strip 1221 and the trailing end of the metal strip 1220 can be brought in close proximity, such as abutting, to form a joint 1272. A movable joiner, such as movable welder 1270, can be suspended above (or below) the joint 1272 and moved in a downstream direction 1246 at the same or approximately the same speed as the metal strip 1220 and subsequent metal strip 1221. Thus, the movable welder 1270 can remain in a constant position with respect to the joint 1272 during travel of the metal strip 1220. The movable welder 1270 can weld or otherwise join the metal strip 1220 to the subsequent metal strip 1221 at the joint 1272, such as through any suitable technique.

Figure 13:
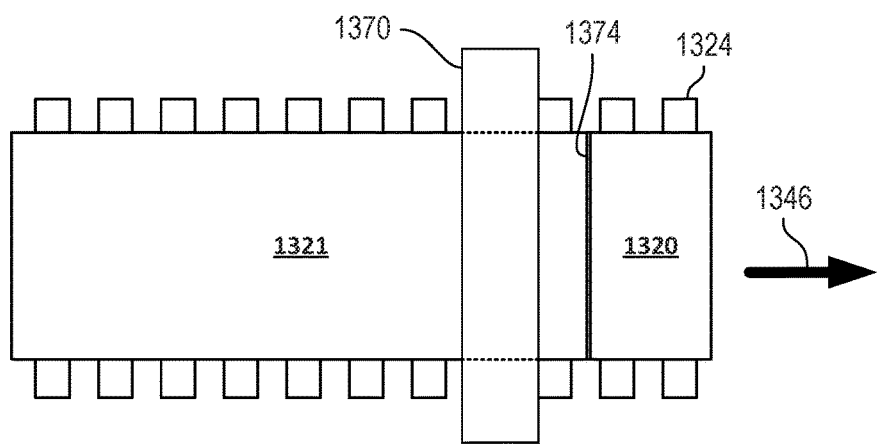
FIG. 13 is a schematic top view diagram depicting a metal strip and a subsequent metal strip during a post-weld phase according to certain aspects of the present disclosure.

FIG. 13 is a schematic top view diagram depicting a metal strip 1320 and a subsequent metal strip 1321 during a post-weld phase according to certain aspects of the present disclosure. In the top view, the metal strip 1320 and subsequent metal strip 1321 are shown being levitated above an array of magnetic rotors 1324. The magnetic rotors 1324 depicted in FIG. 13 can be magnetic rotors 1324 of a tension adjustment zone or a welding/joining zone, which can be located downstream of a uncoiler and upstream of a heating zone.

In the post-weld phase, the subsequent metal strip 1321 and metal strip 1320 have been welded or otherwise joined together at the joint, resulting in a weld 1374 between the subsequent metal strip 1321 and the metal strip 1320. The movable welder 1370 can cease moving in a downstream direction 1346, such as returning back to a storage position. In the post-weld phase, the metal strip 1320 and subsequent metal strip 1321 can begin moving in the downstream direction 1346 at a higher speed than in the welding phase, such as a speed at or near a normal operating speed for heat treating the metal strip 1320.

Figure 14:
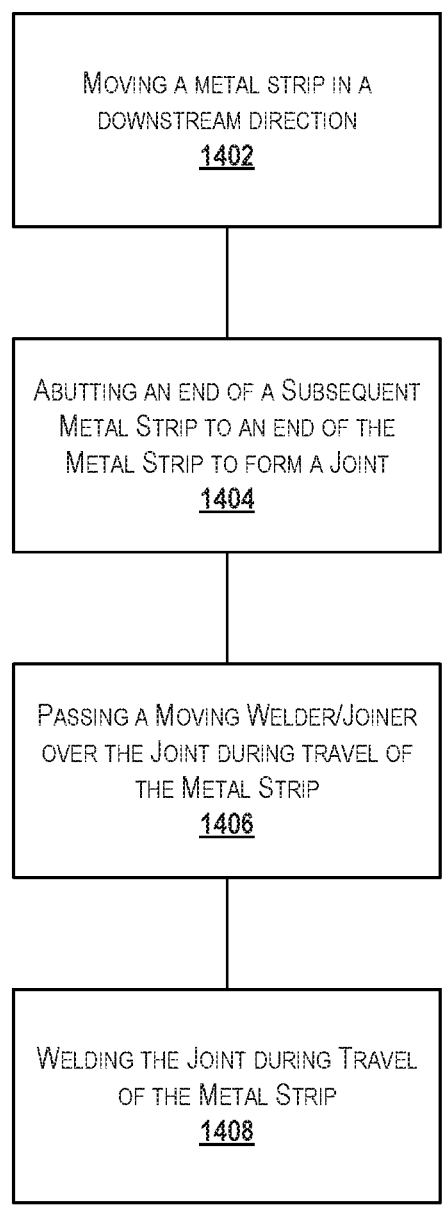
FIG. 14 is a flowchart depicting a process for joining a metal strip to a subsequent metal strip during travel of the metal strip according to certain aspects of the present disclosure.

FIG. 14 is a flowchart depicting a process 1400 for joining a metal strip to a subsequent metal strip during travel of the metal strip according to certain aspects of the present disclosure. At block 1402, a metal strip can be moved in a downstream direction. Moving the metal strip in a downstream direction can include levitating the metal strip on an array of magnetic rotors. At block 1404, a leading end of a subsequent metal strip can be moved towards a trailing end of the metal strip until the ends abut to form a joint. The subsequent metal strip can begin uncoiled at approximately the same time the metal strip ceases uncoiling. At block 1406, a moving welder can be passed adjacent (e.g., over or under) the joint between the metal strip and the subsequent metal strip. The moving welder can be passed adjacent the joint while the metal strip is moving in a downstream direction. Once the moving welder is adjacent the joint, the moving welder can continue moving at the same speed as the joint (e.g. the same speed as the metal strip). At block 1408, the moving welder can weld or otherwise join the joint during travel of the metal strip.

Figure 15:
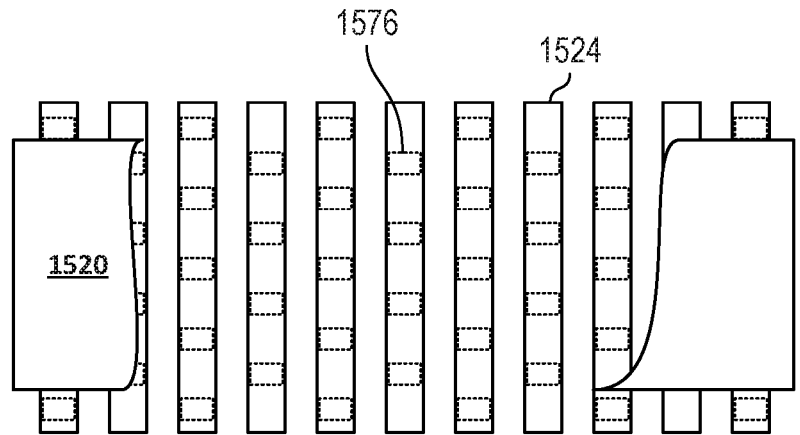
FIG. 15 is a schematic partial-cutaway top view of a section of a processing line depicting a metal strip levitated over an array of magnetic rotors having laterally spaced-apart magnetic sources according to certain aspects of the present disclosure.

FIG. 15 is a schematic partial-cutaway top view of a section of a processing line depicting a metal strip 1520 levitated over an array of magnetic rotors 1524 having laterally spaced-apart magnetic sources 1576 according to certain aspects of the present disclosure. Each of the magnetic rotors 1524 can include two or more magnetic sources 1576, such as permanent magnets, that are laterally spaced apart (e.g., along the length of the magnetic rotor 1524). Each of the magnetic sources 1576 depicted in FIG. 15 can be an array of magnetic sources (e.g., one or more magnetic sources). The laterally spaced-apart magnetic sources 1576 in a magnetic rotor 1524 can be offset with respect to laterally spaced-apart magnetic sources 1576 in an immediately subsequent magnetic rotor 1524. The lateral and longitudinal spacing between magnetic sources 1567 within the array of magnetic rotors can facilitate levitating the metal strip 1520 without substantial heating of the metal strip. In some cases, the magnetic rotors 1524 of FIG. 15 can be similar to the magnetic rotors 224 of FIG. 2.

Figure 16:
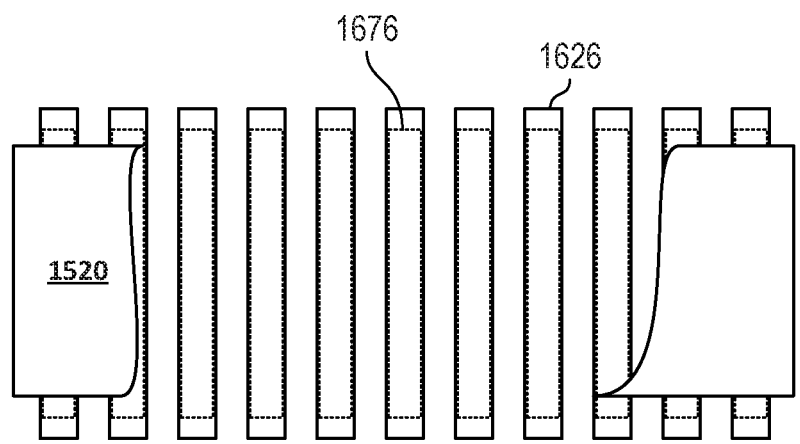
FIG. 16 is a schematic partial-cutaway top view of a section of a processing line depicting a metal strip levitated over an array of magnetic rotors having near full-width magnetic sources according to certain aspects of the present disclosure.

FIG. 16 is a schematic partial-cutaway top view of a section of a processing line depicting a metal strip 1620 levitated over an array of magnetic rotors 1626 having near full-width magnetic sources 1676 according to certain aspects of the present disclosure. Each of the magnetic rotors 1626 can a magnetic source 1676 that extends at least across the full lateral width of the metal strip 1520. In some cases, the magnetic source 1676 can extend across the full length of the magnetic rotor 1626. Each of the magnetic sources 1676 depicted in FIG. 16 can be an array of magnetic sources (e.g., one or more magnetic sources). Magnetic rotors 1626 having full-width or near full-width magnetic sources 1676 can be especially useful for providing an amount of heating to the metal strip 1520 while simultaneously levitating the metal strip 1520. In some cases, the magnetic rotors 1626 of FIG. 16 can be similar to the magnetic rotors 226 of FIG. 2.

The foregoing description of the embodiments, including illustrated embodiments, has been presented only for the purpose of illustration and description and is not intended to be exhaustive or limiting to the precise forms disclosed. Numerous modifications, adaptations, and uses thereof will be apparent to those skilled in the art.

As used below, any reference to a series of examples is to be understood as a reference to each of those examples disjunctively (e.g., "Examples 1-4" is to be understood as "Examples 1, 2, 3, or 4").

Example 1 is a heat treatment line, comprising: a heating zone for accepting a metal strip moving in a downstream direction, the heating zone comprising a plurality of magnetic rotors for inducing eddy currents in the metal strip to heat the metal strip to a peak metal temperature, wherein each of the plurality of magnetic rotors rotates about an axis of rotation perpendicular the downstream direction and parallel a lateral width of the metal strip; a soaking zone positioned downstream of the heating zone for accepting the metal strip and maintaining the peak metal temperature for a duration; and a quenching zone positioned downstream of the soaking zone for rapidly quenching the metal strip from the peak metal temperature.

Example 2 is the heat treatment line of example 1, wherein the plurality of magnetic rotors includes a plurality of magnetic rotor pairs, wherein each of the magnetic rotor pairs include a bottom magnetic rotor positioned opposite the metal strip from a top magnetic rotor.

Example 3 is the heat treatment line of examples 1 or 2, wherein each of the plurality of magnetic rotors comprises a plurality of permanent magnets positioned to rotate about the axis of rotation.

Example 4 is the heat treatment line of examples 1-3, wherein the soaking zone includes an additional plurality of magnetic rotors for levitating the metal strip, wherein each of the additional plurality of magnetic rotors rotates about an axis of rotation perpendicular the downstream direction and parallel the lateral width of the metal strip.

Example 5 is the heat treatment line of example 4, wherein the soaking zone further comprises chamber walls positioned between the metal strip and the additional plurality of magnetic rotors, wherein the chamber walls define a chamber for accepting the metal strip, wherein the chamber is couplable to a supply of gas.

Example 6 is the heat treatment line of examples 4 or 5, wherein the soaking zone further comprises one or more cooling devices for offsetting temperature increases induced in the metal strip by rotation of the additional plurality of magnetic rotors.

Example 7 is the heat treatment line of examples 1-6, further comprising: an uncoiler positioned upstream the heating zone for providing the metal strip to the heating zone from a coil; a leveling roller positioned downstream of the quenching zone for controlling flatness of the metal strip; and a reheating zone positioned downstream of the leveling roller for heating the metal strip, wherein the reheating zone includes one or more additional magnetic rotors.

Example 8 is the heat treatment line of examples 1-7, further comprising a tension adjustment zone for adjusting tension in the metal strip, wherein the tension adjustment zone comprises one or more magnetic rotors rotatable about an axis of rotation perpendicular the downstream direction and parallel the lateral width of the metal strip.

Example 9 is the heat treatment line of examples 1-8, further comprising an uncoiler positioned upstream the heating zone for providing the metal strip to the heating zone from a starter coil and a recoiler positioned downstream the quenching zone for receiving the metal strip after heat treatment and coiling the metal strip onto an ending coil; wherein a passline is defined between the uncoiler and the recoiler along which the metal strip passes through the heating zone, the soaking zone, and the quenching zone without passing through an accumulator.

Example 10 is the heat treatment line of examples 1-9, further comprising a moving welder positioned upstream of the heating zone for welding a subsequent metal strip to the metal strip during travel of the metal strip.

Example 11 is a method of continuous heat treatment, comprising: passing a metal strip adjacent a plurality of magnetic rotors in a downstream direction; rotating the plurality of magnetic rotors, wherein rotating a magnetic rotor includes rotating the magnetic rotor about an axis of rotation perpendicular the downstream direction and parallel a lateral width of the metal strip, and wherein rotating the plurality of magnetic rotors induces eddy currents in the metal strip to heat the metal strip to a peak metal temperature; passing the metal strip through a soaking zone, wherein passing the metal strip through the soaking zone comprises maintaining the peak metal temperature of the metal strip for a duration; and quenching the metal strip from the peak metal temperature.

Example 12 is the method of example 11, wherein the plurality of magnetic rotors includes a plurality of magnetic rotor pairs, wherein each of the magnetic rotor pairs include a bottom magnetic rotor and a top magnetic rotor separated by a gap, and wherein passing the metal strip adjacent the plurality of magnetic rotors comprises passing the metal strip through gaps of the plurality of magnetic rotor pairs.

Example 13 is the method of examples 11 or 12, wherein rotating a magnetic rotor of the plurality of magnetic rotors includes rotating a plurality of permanent magnets about the axis of rotation.

Example 14 is the method of examples 11-13, wherein passing the metal strip through the soaking zone comprises levitating the metal strip, and wherein levitating the metal strip comprises rotating an additional plurality of magnetic rotors adjacent the metal strip.

Example 15 is the method of example 14, wherein passing the metal strip through the soaking zone comprises: passing the metal strip through a chamber defined by chamber walls positioned between the metal strip and the additional plurality of magnetic rotors; and supplying gas to the chamber from a supply of gas.

Example 16 is the method of examples 14 or 15, wherein maintaining the peak metal temperature comprises applying a cooling fluid to the metal strip to offset temperature increases induced in the metal strip by rotation of the additional plurality of magnetic rotors.

Example 17 is the method of examples 11-16, further comprising: uncoiling the metal strip from a starter coil; leveling the metal strip after quenching the metal strip; and reheating the metal strip after leveling the metal strip, wherein reheating the metal strip comprises rotating one or more additional magnetic rotors adjacent the metal strip.

Example 18 is the method of examples 11-17, further comprising threading the metal strip, wherein threading the metal strip comprises: rotating magnetic rotors in a downstream direction, wherein the magnetic rotors are selected from the group consisting of the plurality of magnetic rotors and an additional set of magnetic rotors; passing an end of the metal strip by the magnetic rotors; and reversing rotation of the magnetic rotors to rotate the magnetic rotors in an upstream direction.

Example 19 is the method of examples 11-18, further comprising: uncoiling the metal strip from a starter coil prior to passing the metal strip adjacent the plurality of magnetic rotors; recoiling the metal strip into an ending coil after quenching the metal strip, wherein the metal strip in the ending coil has been heat treated; and not passing the metal strip through an accumulator between uncoiling the metal strip and recoiling the metal strip.

Example 20 is the method of examples 11-19, further comprising joining the metal strip to a subsequent metal strip, wherein joining the metal strip comprises: abutting the metal strip and the subsequent metal strip at a joint during travel of the metal strip; passing a moving joining device over the joint during travel of the metal strip; and joining the joint during travel of the metal strip.

Example 21 is the method of examples 11-20, further comprising at least one of coating or lubricating the metal strip and then reheating the coated or lubricated metal strip.

What is claimed is:

1. A method of continuous heat treatment, comprising:
    passing a metal strip adjacent a first plurality of magnetic rotors in a downstream direction;
    rotating the plurality of magnetic rotors, wherein rotating a magnetic rotor of the first plurality of magnetic rotors comprises rotating the magnetic rotor about an axis of rotation, wherein the axis of rotation is perpendicular the downstream direction, parallel to a lateral width of the metal strip, and does not intersect the metal strip, and wherein rotating the first plurality of magnetic rotors induces eddy currents in the metal strip to heat the metal strip to a peak metal temperature;
    passing the metal strip through a soaking zone, wherein passing the metal strip through the soaking zone comprises maintaining the peak metal temperature of the metal strip for a duration, wherein the soaking zone comprises a second plurality of magnetic rotors for levitating the metal strip, wherein each magnetic rotor of the second plurality of magnetic rotors rotates about an axis of rotation that is perpendicular to the downstream direction and parallel to the lateral width of the metal strip, and wherein each magnetic rotor in the soaking zone comprises a plurality of laterally spaced apart magnetic sources arranged such that lateral positions of the magnetic sources within adjacent magnetic rotors in the soaking zone are offset from one another; and
    quenching the metal strip from the peak metal temperature.

2. The method of claim 1, wherein the first plurality of magnetic rotors comprises a plurality of magnetic rotor pairs, wherein each of the plurality of magnetic rotor pairs comprises a bottom magnetic rotor and a top magnetic rotor separated by a gap, and wherein passing the metal strip adjacent the plurality of magnetic rotors comprises passing the metal strip through gaps of the plurality of magnetic rotor pairs.

3. The method of claim 1, wherein rotating a magnetic rotor of the first plurality of magnetic rotors comprises rotating a plurality of permanent magnets about the axis of rotation.

4. The method of claim 1, wherein passing the metal strip through the soaking zone comprises:
    passing the metal strip through a chamber defined by chamber walls positioned between the metal strip and the second plurality of magnetic rotors; and
    supplying gas to the chamber from a supply of gas.

5. The method of claim 1, wherein maintaining the peak metal temperature comprises applying a cooling fluid to the metal strip to offset temperature increases induced in the metal strip by rotation of the second plurality of magnetic rotors.

6. The method of claim 1, further comprising:
    uncoiling the metal strip from a starter coil;
    leveling the metal strip after quenching the metal strip; and
    reheating the metal strip after leveling the metal strip, wherein reheating the metal strip comprises rotating one or more additional magnetic rotors adjacent the metal strip.

7. The method of claim 1, further comprising threading the metal strip, wherein threading the metal strip comprises:
    rotating magnetic rotors in a downstream direction, wherein the magnetic rotors are selected from the group consisting of the first plurality of magnetic rotors and an additional set of magnetic rotors;
    passing an end of the metal strip by the magnetic rotors; and
    reversing rotation of the magnetic rotors to rotate the magnetic rotors in an upstream direction.

8. The method of claim 1, further comprising:
    uncoiling the metal strip from a starter coil prior to passing the metal strip adjacent the first plurality of magnetic rotors;
    recoiling the metal strip into an ending coil after quenching the metal strip, wherein the metal strip in the ending coil has been heat treated; and
    not passing the metal strip through an accumulator between uncoiling the metal strip and recoiling the metal strip.

9. The method of claim 1, further comprising joining the metal strip to a subsequent metal strip, wherein joining the metal strip comprises:
    abutting the metal strip and the subsequent metal strip at a joint during travel of the metal strip;
    passing a moving joining device over the joint during travel of the metal strip; and
    joining the joint during travel of the metal strip.

10. The method of claim 1, further comprising at least one of coating or lubricating the metal strip and then reheating the coated or lubricated metal strip.

11. A heat treatment line, comprising:
    a heating zone for accepting a metal strip moving in a downstream direction, the heating zone comprising a first plurality of magnetic rotors for inducing eddy currents in the metal strip to heat the metal strip to a peak metal temperature, wherein each magnetic rotor of the first plurality of magnetic rotors rotates about an axis of rotation, wherein each axis of rotation is perpendicular to the downstream direction, parallel to a lateral width of the metal strip, and does not intersect the metal strip;
    a soaking zone positioned downstream of the heating zone for accepting the metal strip and maintaining the peak metal temperature for a duration, wherein the soaking zone comprises a second plurality of magnetic rotors for levitating the metal strip, wherein each magnetic rotor of the second plurality of magnetic rotors rotates about an axis of rotation that is perpendicular to the downstream direction and parallel to the lateral width of the metal strip, and wherein each magnetic rotor in the soaking zone comprises a plurality of laterally spaced apart magnetic sources arranged such that lateral positions of the magnetic sources within adjacent magnetic rotors in the soaking zone are offset from one another; and a quenching zone positioned downstream of the soaking zone for rapidly quenching the metal strip from the peak metal temperature.

12. The heat treatment line of claim 11, wherein the first plurality of magnetic rotors comprises a plurality of magnetic rotor pairs, wherein each of the plurality of magnetic rotor pairs comprises a bottom magnetic rotor positioned opposite the metal strip from a top magnetic rotor.

13. The heat treatment line of claim 11, wherein each of the first plurality of magnetic rotors comprises a plurality of permanent magnets positioned to rotate about the axis of rotation.

14. The heat treatment line of claim 11, wherein the soaking zone further comprises chamber walls positioned between the metal strip and the additional plurality of magnetic rotors, wherein the chamber walls define a chamber for accepting the metal strip, wherein the chamber is couplable to a supply of gas.

15. The heat treatment line of claim 11, wherein the soaking zone further comprises one or more cooling devices for offsetting temperature increases induced in the metal strip by rotation of the additional plurality of magnetic rotors.

16. The heat treatment line of claim 11, further comprising:

an uncoiler positioned upstream the heating zone for providing the metal strip to the heating zone from a coil;

a leveling roller positioned downstream of the quenching zone for controlling flatness of the metal strip; and a reheating zone positioned downstream of the leveling roller for heating the metal strip, wherein the reheating zone includes one or more additional magnetic rotors.

17. The heat treatment line of claim 11, further comprising a tension adjustment zone for adjusting tension in the metal strip, wherein the tension adjustment zone comprises one or more magnetic rotors rotatable about an axis of rotation perpendicular the downstream direction and parallel the lateral width of the metal strip.

18. The heat treatment line of claim 11, further comprising an uncoiler positioned upstream the heating zone for providing the metal strip to the heating zone from a starter coil and a recoiler positioned downstream the quenching zone for receiving the metal strip after heat treatment and coiling the metal strip onto an ending coil, wherein a passline is defined between the uncoiler and the recoiler along which the metal strip passes through the heating zone, the soaking zone, and the quenching zone without passing through an accumulator.

19. The heat treatment line of claim 11, further comprising a moving welder positioned upstream of the heating zone for welding a subsequent metal strip to the metal strip during travel of the metal strip.

* * * * *